(12) United States Patent
Shiller

(10) Patent No.: US 7,797,107 B2
(45) Date of Patent: Sep. 14, 2010

(54) METHOD AND SYSTEM FOR PROVIDING WARNINGS CONCERNING AN IMMINENT VEHICULAR COLLISION

(76) Inventor: Zvi Shiller, 2 Hameyasdim Street, Kiryat Ono, 55521 (IL)

( * ) Notice: Subject to any disclaimer, the term of this patent is extended or adjusted under 35 U.S.C. 154(b) by 976 days.

(21) Appl. No.: 10/571,977

(22) PCT Filed: Sep. 5, 2004

(86) PCT No.: PCT/IL2004/000853

§ 371 (c)(1),
(2), (4) Date: Aug. 14, 2006

(87) PCT Pub. No.: WO2005/027076

PCT Pub. Date: Mar. 24, 2005

(65) Prior Publication Data

US 2007/0080825 A1    Apr. 12, 2007

Related U.S. Application Data

(60) Provisional application No. 60/502,942, filed on Sep. 16, 2003.

(51) Int. Cl.
*G08G 1/16* (2006.01)
(52) U.S. Cl. ............................. 701/301; 701/3; 701/300; 180/168; 180/169; 180/171; 180/274; 340/435; 340/436; 340/903; 340/961
(58) Field of Classification Search .................. None
See application file for complete search history.

(56) References Cited

U.S. PATENT DOCUMENTS 5,343,206 A * 8/1994 Ansaldi et al. ................ 342/70

(Continued)

FOREIGN PATENT DOCUMENTS

DE    44 26 090    7/1995
EP    1223093    8/2003

OTHER PUBLICATIONS

International Search Report (ISR) from the corresponding PCT application No. PCT/IL2004/000853.

(Continued)

*Primary Examiner*—Khoi Tran
*Assistant Examiner*—Jonathan Sample
(74) *Attorney, Agent, or Firm*—Kinney & Lange, P.A.

(57) ABSTRACT

Method for transmitting a warning signal to a driver of a driven vehicle regarding an impending collision with a moving and/or stationary object in the vicinity of the driven vehicle. The method comprises the following steps of providing the driven vehicle with means for obtaining updated data regarding, position, velocity vector and predicted moving path of the objects; selecting a series of one or more time horizons having decreasing or increasing duration; for the longest of the selected time horizons: generating a linear velocity object (LVO) and/or non-linear velocity object (NLVO) of each of the objects; selecting a sampling time interval $\Delta t$, during which an LVO and/or NLVO is generated; determining a range of feasible velocity vector changes for the driven vehicle that are attainable within a performance time interval $\Delta T$; repeatedly providing the driver, after each $\Delta t$, with information regarding feasible velocity vector changes for the performance time interval; sensing, estimating or assuming dynamic changes parameters representing the movement of the driven vehicle within the performance time interval, and whenever required, generating a warning signal with an escalating severity level that reflects the relative imminence of collision with the objects and that corresponds to the longest time horizon; repeating the steps above, while each time generating an updated LVO and/or NLVO for a subsequent sampling time interval, until reaching another selected time horizon which is shorter than a previously selected time horizon and another selected time horizon, until collision is unavoidable.

23 Claims, 23 Drawing Sheets

U.S. PATENT DOCUMENTS

| | | | | |
|---|---|---|---|---|
| 5,529,138 | A | * | 6/1996 | Shaw et al. .................. 180/169 |
| 5,594,414 | A | * | 1/1997 | Namngani .................. 340/436 |
| 5,870,303 | A | * | 2/1999 | Trovato et al. ................ 700/61 |
| 5,983,161 | A | * | 11/1999 | Lemelson et al. ........... 701/301 |
| 6,561,301 | B1 | * | 5/2003 | Hattori et al. ............... 180/274 |
| 7,089,114 | B1 | * | 8/2006 | Huang ........................ 701/301 |
| 2002/0117340 | A1 | * | 8/2002 | Stettner ...................... 180/169 |
| 2003/0014165 | A1 | * | 1/2003 | Baker et al. ..................... 701/3 |
| 2004/0017288 | A1 | * | 1/2004 | Rao et al. ................... 340/435 |
| 2004/0024528 | A1 | * | 2/2004 | Patera et al. ................ 701/301 |
| 2004/0189512 | A1 | * | 9/2004 | Takashima et al. ............ 342/70 |

OTHER PUBLICATIONS

Fiorini P et al: "Time optimal trajectory . . . environments" Proceedings. 1996 IEEE Int'l Conf. on Robotics & Automation, IEEE, NY, vol. 2, Apr. 1996, pp. 1553-1558, XP010162963.

Yamamoto M et al: "Online navigation . . . obstacles" Proceedings of the 2001 IEEE Int'l Symposium on Assembly & Task Planning . . . in 21st Cent, May 2001, pp. 13-18, XP002314010.

Shiller Z et al: "Autonomous negotiation . . . traffic" Proceedings of the Spie—The Int'l Soc. for Opt. Eng USA, vol. 2592, Oct. 1995, pp. 83-92, XP009042719.

Godbole et al, "Design of Emergency Maneuvers for Automated Highway System: Obstacle Avoidance Problem," CDC 1997.

Shiller et al, ASME Journal of Dynamic Systems, Measurement and Control, vol. 120, No. 1. Mar. 1998, pp. 37-44.

P. Fiorini et al, International Journal of Robotics Research, 17(7): 760-772, Jul. 1998.

Fiorini, P., and Shiller, Z., "Motion Planning in Dynamic Environments . . . Paradigm," IEEE Conf. on Robotics and Automation, Atlanta, GA, May 1993, vol. 1, pp. 560-565.

Shiller, Z. Large, F., and Sekhavat, S., "Motion Planning in Dynamic Environments: . . . Trajectories," IEEE Int. Conf. on Robotics and Automation, May 2001.

Laugier C., Sekhavat S., Large F., Hermosillo J., Shiller Z., "Some Steps Towards Autonomous Cars," Fourth IFAC Sym. on Intel. Auto. Vehicles, Sapporo Japan, Sep. 5-7, 2001.

Large F., Shiller Z., Sekhavat S., and Laugier C., "Towards Real-Time Global Motion Planning in a Dynamic Environment Using the NLVO Concept," IROS, Switzerland, Oct. 2002.

F. Large, S.Sekhavat, Z.Shiller and C.Laugier, "Using Non-Linear Velocity . . . Environment." In Proc of the Inter. Conf. on Auto., Robotics and Computer Vision (ICARCV 2002).

Shiller, Z., Sundar, S., "Emergency Maneuvers of AHS Vehicles", 1995 SAE Future Transportation Technology Conference, Costa Mesa; CA, Aug. 1995, SAE Paper 951893, SP-1106.

Fiorini, P., and Shiller, Z., "Robot Motion Planning in Dynamic Environments," Robotics Research, G. Giralt and G. Hirzinger Editors, Springer-Verlag, London, 1996,pp. 237-248.

Shiller, Z., Sundar S., "Emergency maneuvers of autonomous vehicles," Preprints of the 13th World Congress, IFAC96, San Francisco, vol. Q, pp. 393-398, Jul. 1996.

* cited by examiner

METHOD AND SYSTEM FOR PROVIDING WARNINGS CONCERNING AN IMMINENT VEHICULAR COLLISION

FIELD OF THE INVENTION

The present invention relates to the field of traffic safety systems. More particularly, the invention relates to a system for warning a driver of a vehicle from impending collisions with other vehicles or objects present in his vicinity.

BACKGROUND OF THE INVENTION

Collision avoidance is a basic requirement of all drivers of ground vehicles, such as automobiles, trucks, motorcycles (hereinafter referred to as "vehicles") while driving to a desired destination. As shown in FIG. 1, the basic collision avoidance maneuvers of a given vehicle A (hereinafter referred to as the "driven vehicle"), in order to avoid a collision with an obstacle O, e.g. a stalled vehicle, in its forward path, include a stopping maneuver S in its current lane and a lane change maneuver L by which driven vehicle A safely merges with vehicles B and C in the neighboring lane.

Various factors such as the mechanical capabilities of the driven car, passenger comfort, and the trajectories (paths and velocity profiles) of moving vehicles in neighboring lanes are taken into account while planning and executing a safe collision avoidance maneuver. At times, a collision is unavoidable due to the need to consider such a large number of factors, often at a split second, while hindered for example by poor visibility, high speed, fatigue, and old age.

In order to increase the rate of safe collision avoidance maneuvers, the prior art has introduced computer generated avoidance maneuvers for completely automated vehicles or for humanly driven vehicles.

U.S. Pat. No. 5,343,206 discloses a method for avoiding a collision between a motor vehicle and obstacles in the path of the vehicle by forming a radar map of the area in front of the vehicle, reconstructing the geometry of the road, identifying its edges, detecting the position and speed of the vehicle with respect to the road, determining the presumed path of the vehicle on the basis of the road geometry and the maneuver being carried out by the vehicle at that instant, detecting objects on the radar map found lying in the presumed path of the motor vehicle and displaying the map found in a perspective representation, ignoring objects which are off the road and indicating objects in the path of the vehicle in a different manner according to their hazard and if appropriate, generating alarms of an acoustic type.

EP 1223093 discloses a braking control system that includes a control unit which is electronically connected to an object detector and a host vehicle speed sensor for automatically controlling, depending on a host vehicle speed and a relative distance, a braking force needed for an automatic braking operation. When the host vehicle is approaching an object ahead, such as a preceding vehicle, the control unit detects the presence or absence of a driver's intention for lane-changing. In the presence of the driver's intention for lane-changing, the control unit inhibits preliminary braking control, initiated prior to the driver's braking action, or reduces the degree of limitation on supplementary braking control, through which a value of a controlled quantity is brought closer to a target deceleration rate needed for collision-avoidance.

U.S. Pat. No. 5,529,138 discloses an automobile collision avoidance system based on laser radars for aiding in avoidance of automobile collisions. The system detects the location, the direction of movement, the speed and the size of all obstacles specifically and precisely. A steering wheel rotation sensor or a laser gyroscope is utilized to give information of system-equipped vehicle's directional change. The system compares the predicted collision time with the minimal allowable time to determine the imminency of a collision, and when determined, provides a warning. An optional automatic braking device is used when the vehicle user fails to respond to a warning. Furthermore, a wheel skidding detecting system based on a discrepancy between the directional change rate predicted by a steering wheel rotation sensor and the actual directional change rate detected by a laser gyroscope is also disclosed.

U.S. Pat. No. 5,870,303 discloses a method for controlling the maneuvers of a robotic vehicle in the presence of obstacles by using a three-dimensional configuration space which propagates cost waves in configuration space and using budding search strategy.

Obstacle avoidance by automated vehicles that merge with neighboring traffic has been achieved by first producing a gap in a neighboring lane and then executing a lane change maneuver into the produced gap [Godbole et al, "Design of Emergency Maneuvers for Automated Highway System: Obstacle Avoidance Problem," CDC 1997]. The drawback of such an approach is that the driven vehicle is dependent upon the maneuvers of neighboring vehicles with which the driven car communicates and which may not accurately perform the maneuver requested by the driven vehicle.

In another approach, the minimum clearing distance, beyond which an obstacle cannot be avoided at a given initial speed, is determined. [Shiller et al, ASME Journal of Dynamic Systems, Measurement and Control, Vol. 120, No. 1. March 1998, pp. 37-44]. Although a lane change maneuver is generally the most desirable option since traffic flow is least disturbed, such a maneuver may not be immediately feasible, depending on the distance to the obstacle, speed of the driven vehicle, and the volume of traffic in the neighboring lanes. If a lane change maneuver is not feasible, a full stop is generally the best alternative. However, if the initial speed and distance from the obstacle are insufficient for a full stop, the driven vehicle needs to decelerate until the traffic conditions allow a lane change maneuver to take place. Once the driven vehicle approaches the obstacle within the minimum clearing distance, a collision is unavoidable.

Determination of the minimum clearing distance CD is illustrated in FIG. 2. The minimum clearing distance is the longitudinal distance along the X-axis, which represents the initial direction of driven vehicle A, from initial position $x_o$ of driven vehicle A until intersection point 10, at which a vertex of driven vehicle A intersects a vertex of the stationary obstacle O as driven vehicle A follows an optimal lane transition maneuver until final position $X_f$. An optimal lane transition maneuver is a maneuver that minimizes longitudinal displacement of driven vehicle A without collision while taking into account the initial speed $\dot{\chi}_o$, vehicle dynamics, and road conditions. Similarly, an optimal lane transition maneuver may be carried out for a moving obstacle, as well.

FIG. 3 graphically illustrates three regimes of vehicular driving conditions in terms of the difficulty in avoiding a collision with a detected obstacle. Each regime is representative of various combinations of vehicular speed and minimum clearing distance from the obstacle (hereinafter referred to as "states"). The clearance curve is representative of the relationship between initial speed $\dot{\chi}_o$ and minimum clearance distance CD for an optimal lane transition maneuver, which may be generated while considering the driver's reaction time, as well as the motion of the obstacle. The clearance curve delimits the boundary of safe states of a driven vehicle (Region II), which result in avoidance of the obstacle, from states which result in an unavoidable collision (Region III). The stopping distance curve delimiting the boundary of various states of a driven vehicle which facilitate deceleration thereof to a full stop without colliding with the obstacle (Region I) is also illustrated. When the obstacle is detected in Region I, sufficient time remains for a full stop or a lane change maneuver without changing speed. When the obstacle is detected in Region II, e.g. at point 11, the driven vehicle is precluded from making a full stop, and must perform a lane change maneuver. The driven vehicle may decelerate, e.g. from point 11 to point 13, and then perform an optimal lane transition maneuver, after which the state of the driven vehicle corresponds to the clearance curve. When the obstacle is detected in Region III, e.g. point 15, the driven vehicle is precluded from performing a lane change maneuver, and is recommended to remain in the current lane and to decelerate at the maximum deceleration. By being decelerated to a maximum level, the driven vehicle avoids a more dangerous collision and is involved in a head-on collision at a lower speed, e.g. at point 17, at which speed the driven vehicle is generally designed to withstand the resulting impact such as by means of a bumper. If the driven car were to perform a lane change maneuver in Region III, a more dangerous off-center collision or loss of control is liable to result.

Although such an approach is effective in terms of determining a suitable avoidance maneuver with a detected stationary (or moving) obstacle, this approach does not directly consider the vehicles in the neighboring lane nor when vehicles move in an unpredicted fashion. Such situation may be handled using a method for collision avoidance of moving obstacles, by P. Fiorini et al, International Journal of Robotics Research, 17(7): 760-772, July, 1998, which is based on the concept of velocity obstacles (VO). As referred to herein, a velocity obstacle is a set of absolute velocity vectors of a driven vehicle that result, at a future time, in a collision with a given moving obstacle.

Referring now to FIG. 4, the initial position of a driven vehicle and a moving obstacle are indicated by points A and B, respectively, while circle B represents the obstacle. The initial velocity vectors of driven vehicle A and moving obstacle B are generated and are indicated by $V_A$ and $V_B$, respectively. The relative velocity vector between A and B is indicated by $V_{AB}$. A planar sector (hereinafter referred to as a "collision cone"), which is representative of all possible relative velocity vectors $V_{AB}$ and having an apex coinciding with A, is then generated. Collision cone 20 is bounded by lines R and F which originate at A and are tangent to circle B. Therefore any relative velocity vector $V_{AB}$ coinciding with collision cone 20 will result in a collision and any relative velocity vector $V_{AB}$ not coinciding with collision cone 20 will result in collision-free motion, assuming that obstacle B maintains its current shape and speed.

In order to determine an optimal collision avoidance maneuver with respect to a plurality of obstacles, it is graphically advantageous to translate the generated collision cone to point A', as shown in FIG. 5. By adding velocity vector $V_B$ to each velocity vector included within collision cone 20 (FIG. 4), velocity obstacle (VO) 25 is produced, which is representative of all possible absolute velocity vectors $V_A$ having an apex coinciding with A' at the end of vector $V_B$. Since the illustrated $V_A$ penetrates VO 25, such an absolute velocity will result in a collision. Similarly, a plurality of velocity obstacles, e.g. VO 25 and 26, for a corresponding number of obstacles, e.g. B and $B_1$, may be generated, as shown in FIG. 6. Any absolute velocity vector $V_A$ that is outside of all of the velocity objects, such as the absolute velocity vector $V_A$ illustrated in FIG. 6 the end of which coincides with border R' of VO 25 at point 29, will result in collision-free motion, assuming that the obstacles maintain their current shape and speed. Therefore, any velocities of driven vehicle A that may be represented by a vector that elongates starting at point A and terminates inside the overlapping region between VOs 25 and 26, will result in a collision with obstacle B or B1.

At times, the penetration of an absolute velocity vector into a VO is representative of a collision that is of a negligible risk. Such a predicted collision may occur, for example, after a long time period, if driven vehicle A and the obstacle maintain their current velocity vector. To save valuable calculation time, a VO may be truncated at a predetermined time horizon TH, or time prior to occurrence of a potential collision. As shown in FIG. 7, VO 25 is truncated at predetermined TH such that truncated portion 28 is made to be non-displayable. As the remaining portion of VO 25 is shown to be not penetrated by absolute velocity vector $V_A$, this velocity of A therefore, no longer presents a reasonable risk of collision with obstacle B, within $t_h$.

Although the aforementioned prior art methods may provide information regarding the likelihood of a collision, the prior art methods are incapable of determining in real time the most preferred maneuver among a plurality of possible collision avoidance maneuvers. Also, the prior art methods determine a single collision avoidance maneuver for given velocity vectors of a driven vehicle and obstacle, respectively. However, the velocity vectors of the driven vehicle and obstacle are frequently varied in an unpredictable fashion such that the single generated collision avoidance maneuver ceases to be a feasible possibility for preventing a collision. Furthermore, the prior art methods are incapable of determining an optimal collision mitigating maneuver once it is apparent that a collision with the driven vehicle is unavoidable.

It is an object of the present invention to provide a method and system for determining a driver initiated optimal collision mitigating maneuver once it is apparent that a collision with a driven vehicle is unavoidable.

It is an object of the present invention to provide a driver of a vehicle with a set of warnings having escalating severity levels which are associated with vehicular maneuvers, regarding the risk of a collision with stationary and/or moving obstacles in the vicinity of the driven vehicle.

It is another object of the present invention to offer a driver of a vehicle a set of feasible options for avoiding a collision with stationary and/or moving obstacles in the vicinity of the driven vehicle.

It is yet another object of the present invention to determine the most optimal collision avoidance or collision mitigating maneuver in iterative fashion with respect to the instantaneous position and velocity vector of a driven vehicle and detected obstacle.

Other objects and advantages of the invention will become apparent as the description proceeds.

SUMMARY OF THE INVENTION

The present invention is directed to a method for transmitting a warning signal to a driver of a driven vehicle regarding an impending collision with a moving and/or stationary object in the vicinity of said driven vehicle. The method comprises the following steps:

a) providing said driven vehicle with means for obtaining updated data regarding, position, velocity vector and predicted moving path of said objects;

b) selecting a series of one or more time horizons having decreasing or increasing duration; for the longest of said selected time horizons:
c.1) generating a linear velocity object (LVO) and/or non-linear velocity object (NLVO) of each of said objects;
c.2) selecting a sampling time interval Δt, during which an LVO and/or NLVO is generated;
c.3) determining a range of feasible velocity vector changes for said driven vehicle that are attainable within a performance time interval ΔT;
c.4) repeatedly providing the driver, after each Δt, with information regarding feasible velocity vector changes for said performance time interval;
c5) sensing, estimating or assuming dynamic changes parameters representing the movement of said driven vehicle within said performance time interval, and whenever required, generating a warning signal with an escalating severity level that reflects the relative imminence of collision with said objects and that corresponds to said longest time horizon;
c.7) repeating steps c.1) to c.6) above, while each time generating an updated LVO and/or NLVO for a subsequent sampling time interval, until reaching another selected time horizon which is shorter than a previously selected time horizon;
d) repeating step c) above for said another selected time horizon, until collision is unavoidable.

The time to collision may be determined when collision is unavoidable. The velocity changes may include changes in direction and/or absolute speed of the driven vehicle. The ranges of feasible velocity changes that can be reachel within a performance time interval are determined according to the performance capability of the driven vehicle.

The invention is also directed to a method for determining an optimal collision mitigating maneuver to be executed by a driver, comprising:
providing a navigational system carried by a driven vehicle for sensing navigational conditions of said driven vehicle and of detected vehicles, for processing data associated with said sensed navigational conditions, and for transmitting information of interest to the driver associated with said processed data;
generating, based on said processed data, a velocity obstacle corresponding to each of said detected vehicles, each of said generated velocity obstacles being representative of a set of possible velocity vectors associated with motion of said driven vehicle that would result in a collision with a corresponding detected vehicle;
determining possible driver initiated collision avoidance maneuvers to be executed along an unobstructed path corresponding to clearance in the vicinity of one or more of said velocity obstacles;
determining that a collision between said driven vehicle and one of said detected vehicles is unavoidable once velocity obstacles completely obstruct all lanes in the vicinity of said detected vehicle;
comparing, for different regions of each of said velocity obstacles, a predicted magnitude of impact for a collision between said driven vehicle and one of said detected vehicles;
determining an optimal collision mitigating maneuver whereby a selected velocity vector associated with motion of said driven vehicle is to be directed to a region of a velocity obstacle that would result in a collision between said driven vehicle and one of said detected vehicles having a largest predicted magnitude of impact; and
transmitting to the driver said determined optimal collision mitigating maneuver.

Whenever required, a pre-crash mode may be initiated whereby vehicular safety accessories are activated. One or more airbags may be inflated within the interior of the driven vehicle and/or at the exterior of the driven vehicle, e.g., to extend the bumper.

The velocity obstacle may be an LVO or an NLVO.

The method of the present invention may be performed by comparing the relative size of a velocity obstacle, a relatively large velocity obstacle indicating that the corresponding detected vehicle is substantially larger and more massive than the driven vehicle and/or by comparing the relative depth of penetration of one velocity vector within the corresponding velocity obstacles. The time to collision of the driven vehicle with each of the detected vehicles may also be compared, when a longer time to collision being indicative of a lower magnitude of impact.

An optimal collision mitigating maneuver may be determined by
generating a velocity obstacle, with respect to the position of the driven vehicle, for each detected vehicle at an initial time of detection;
generating a velocity frame delimiting the range of velocity vectors attainable by the driven vehicle in a performance time interval subsequent to the initial time;
generating a set of velocity obstacles for each detected vehicle at each sampling time interval subsequent to the initial time, until the end of said performance time interval;
superimposing said generated velocity frame on each of said sets, whereby to generate a composite representation;
determining which of said generated composite representations includes a region of a velocity obstacle having a lowest predicted magnitude of impact; and
determining an optimal collision mitigating maneuver by generating a velocity vector directed from the end of said velocity vector of the driven vehicle to said region having a lowest predicted magnitude of impact.

The invention is also directed to a system for transmitting a warning signal to a driver of a driven vehicle regarding an impending collision with a detected vehicle in the vicinity of said driven vehicle, that comprises:
sensors for determining the navigational conditions of driven and detected vehicles;
an on-board computer suitable for
processing data associated with said sensed navigational conditions;
generating, based on said processed data, a velocity obstacle for each of said detected vehicles, each of said generated velocity obstacles being representative of a set of possible velocity vectors associated with motion of said driven vehicle that would result in a collision with a corresponding detected vehicle;
determining that a collision between said driven vehicle and one of said detected vehicles is unavoidable once velocity obstacles completely obstruct all lanes in the vicinity of said detected vehicle; and
transmitting a warning signal to the driver in an escalating degree of severity concerning the imminence of collision between said driven vehicle and one of said detected vehicles; and
a receiver and/or display for receiving said warning signal.

The system may further comprise at least one safety accessory, e.g., at least one airbag or an extendible bumper, for mitigating the impact of collision between the driven vehicle and a detected vehicle and means for activating said at least one safety accessory following transmission of said warning signal. The system may further comprise control components for temporarily controlling the operation of the driven vehicle during a slave mode, upon consent of the driver, means for overriding the slave mode, an indicator for alerting the driver when the driven vehicle is set in a slave mode, or a screen for displaying a clearance curve generated at an instantaneous sampling time interval and delimiting the boundary of safe states of the driven vehicle from states which result in an unavoidable collision, an instantaneous state of the driven vehicle with respect to the clearance curve being displayable by means of said screen.

DETAILED DESCRIPTION OF PREFERRED EMBODIMENTS

The present invention is a method and system for providing warnings for in-lane and lane change impending collisions, and/or for determining the most optimal collision avoidance maneuver, from a plurality of possible collision avoidance maneuvers for a driven vehicle, the paths of which are generated by an on-board vehicular navigational system. The most optimal collision avoidance maneuver is generally a maneuver that is associated with the lowest risk of collision. If the navigational system determines that a collision is unavoidable, a warning is displayed which alerts the driver of the imminence of collision and sets an airbag system into a pre-crash mode, to minimize damage to the driven vehicle.

The navigational system comprises a suitable number and type of sensors, as well known to those skilled in the art, for accurately determining the navigational conditions, including velocity vector, acceleration, distance from the driven vehicle, and trajectory, of vehicles which are within a predetermined distance from the driven vehicle (hereinafter referred to as "detected vehicles"), as well as for determining the motion of the driven vehicle. The computational power of the navigational system is sufficiently high to generate velocity obstacles based on the instantaneous motion of both the driven and detected vehicles at a significantly faster rate than the response time of the drivers of the given vehicles.

Linear Velocity Obstacles

For purposes of clarity, FIGS. 8-12 illustrate various principles and assumptions associated with the method of the invention.

Figure 8:
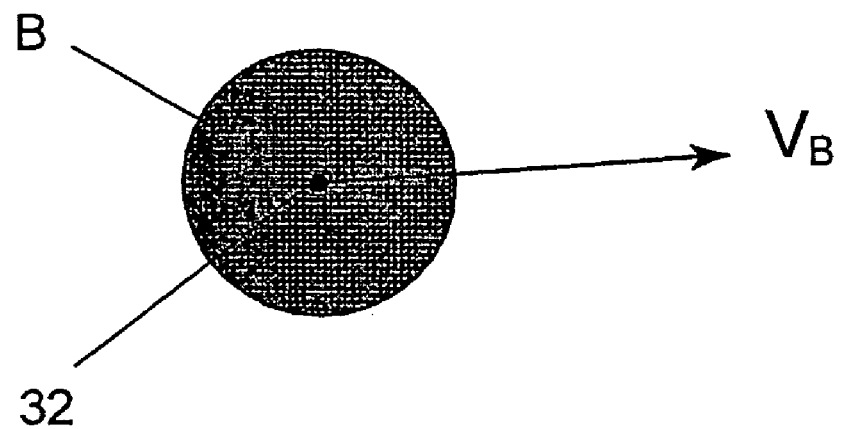
Figure 8:
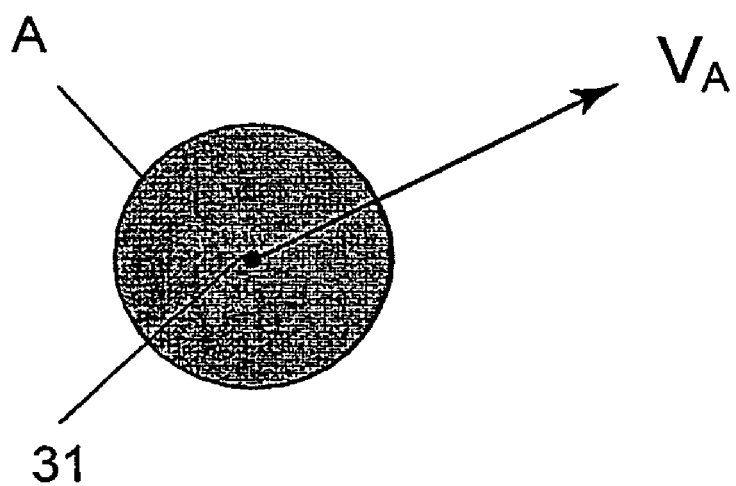

As shown in FIG. 8, each vehicle is approximated by a basic circle, with the length of diameter D of a basic circle corresponding to the relative size of the vehicle. Vehicle A is designated as the vehicle for which a driver initiated collision avoidance maneuver is desired (hereinafter referred to as the "driven vehicle"), i.e. its driver is assisted by a computerized navigational system to carry out a collision avoidance maneuver. A detected vehicle, which is within the detection range of the sensors in communication with the driven vehicle navigational system, is designated as B. When more than one vehicle is detected, each detected vehicle is designated by a different subscript. The center of each basic circle represents the position of the corresponding vehicle, such that the distance between centers 31 and 32 of basic circles A and B, respectively, is proportional to the actual distance between driven vehicle A and detected vehicle B at the time when the latter is detected (hereinafter referred to as the "initial time"). At the initial time, the navigational system generates velocity vectors $V_A$ and $V_B$ for driven vehicle A and detected vehicle B, respectively, such that the origin of each velocity vector is positioned at the center of the corresponding basic circle. The length of each generated velocity vector is representative of its magnitude. The designation of a vector such as $V_A$ or $\vec{V}_a$ is interchangeable.

Figure 9B:
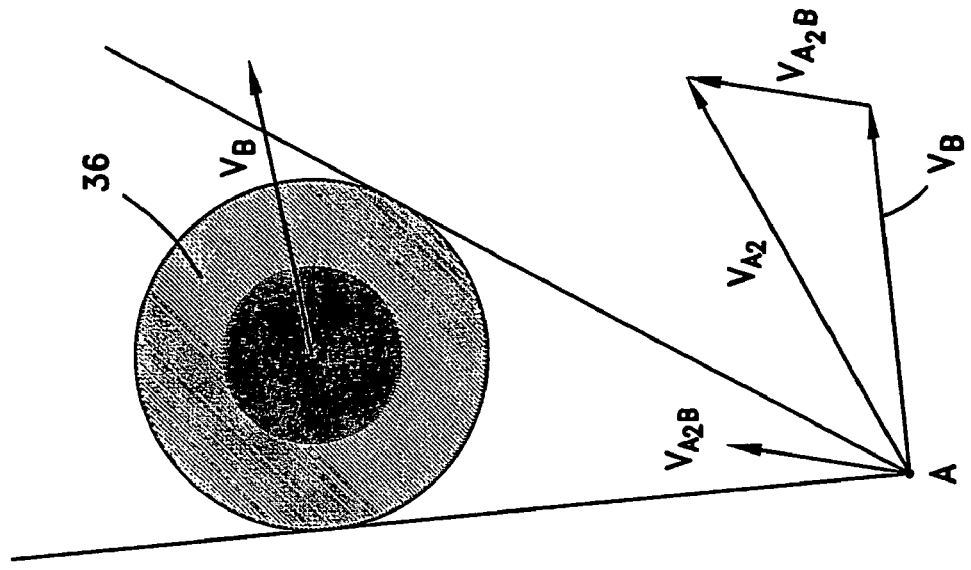
Figure 9A:
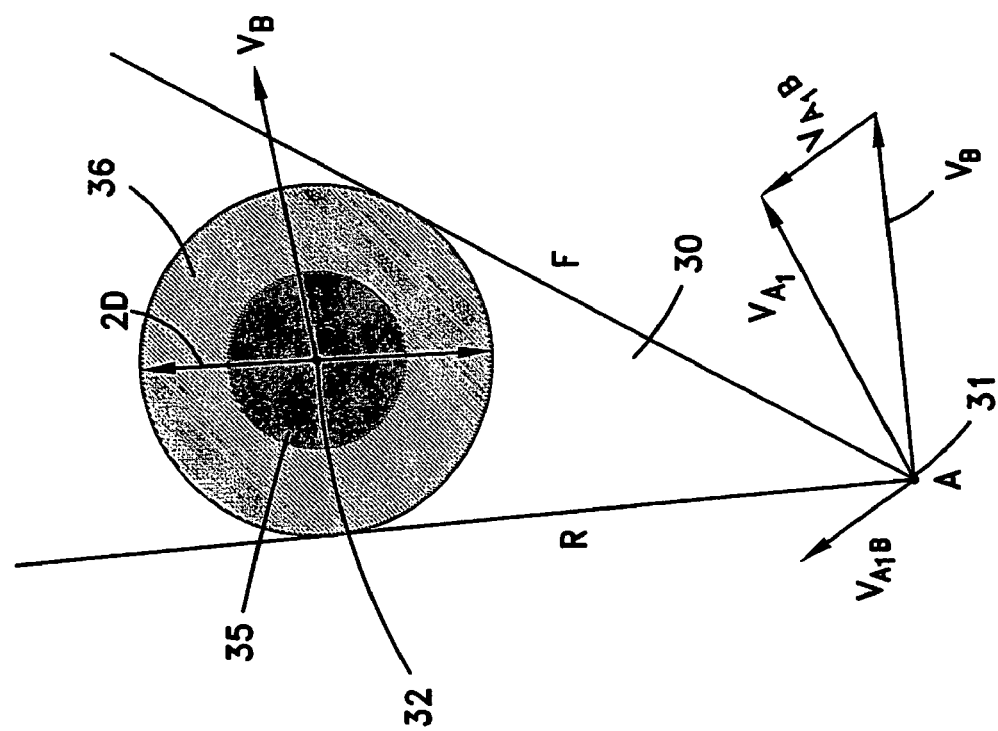

With reference to FIGS. 9A-B, basic circle 35 of detected vehicle B is enlarged by a factor of 2, as a margin of safety, to a circle 36 having a diameter of 2D (hereinafter referred to as an "enlarged circle") with a center at point 32. Likewise the basic circle of driven vehicle A is compressed to point 31. The following description and illustrations of the method of the invention therefore relate to an enlarged circle B and a compressed circle A, the latter being referred to hereinafter as "A" for brevity. In this example, the enlarged circle has been enlarged by a factor of 2 assuming that both the detected and driven vehicles of approximately similar size. However, if the relative size between the detected and driven vehicles is significantly different, other enlargement factors may be implemented. For example, if the driven vehicle is a truck and the detected vehicle is a private car, the enlargement factor may be as large as 5. Alternatively, a larger vehicle may be represented by several circles used for representing the smaller cars.

Compressing circle A provides a point of reference for generating a relative velocity cone. Relative velocity cone 30 bounded by lines R and F which originate at A and are tangent to enlarged circle 36 is then generated. Relative velocity cone 30 is representative of all possible relative velocity vectors associated with vehicle A that will result in a collision with vehicle B. For example, relative velocity vector $V_{A1B}$ is generated from the relative difference between absolute velocity vector $V_{A1}$ originating from A and absolute velocity vector $V_B$ originating from the center of B, which is copied and positioned in such a way that its origin coincides with A, as shown in FIG. 9A. As can be clearly seen, relative velocity vector $V_{A1B}$ is directed outwardly from the boundaries of relative cone 30, indicating that driven vehicle A will not collide with detected vehicle when driven at absolute velocity vector $V_{A1}$. However, as shown in FIG. 9B, relative velocity vector $V_{A2B}$ generated from the relative difference between absolute velocity vector $V_{A2}$ and absolute velocity vector $V_B$ penetrates the boundaries of relative cone 30, indicating that driven vehicle A will collide with detected vehicle when driven at absolute velocity vector $V_{A2}$. It will be appreciated that use of a relative velocity cone advantageously provides a fast, simple and reliable geometric method of determining whether the driven vehicle is liable to be involved in a collision when being driven at the instantaneous velocity vector.

Figure 10:
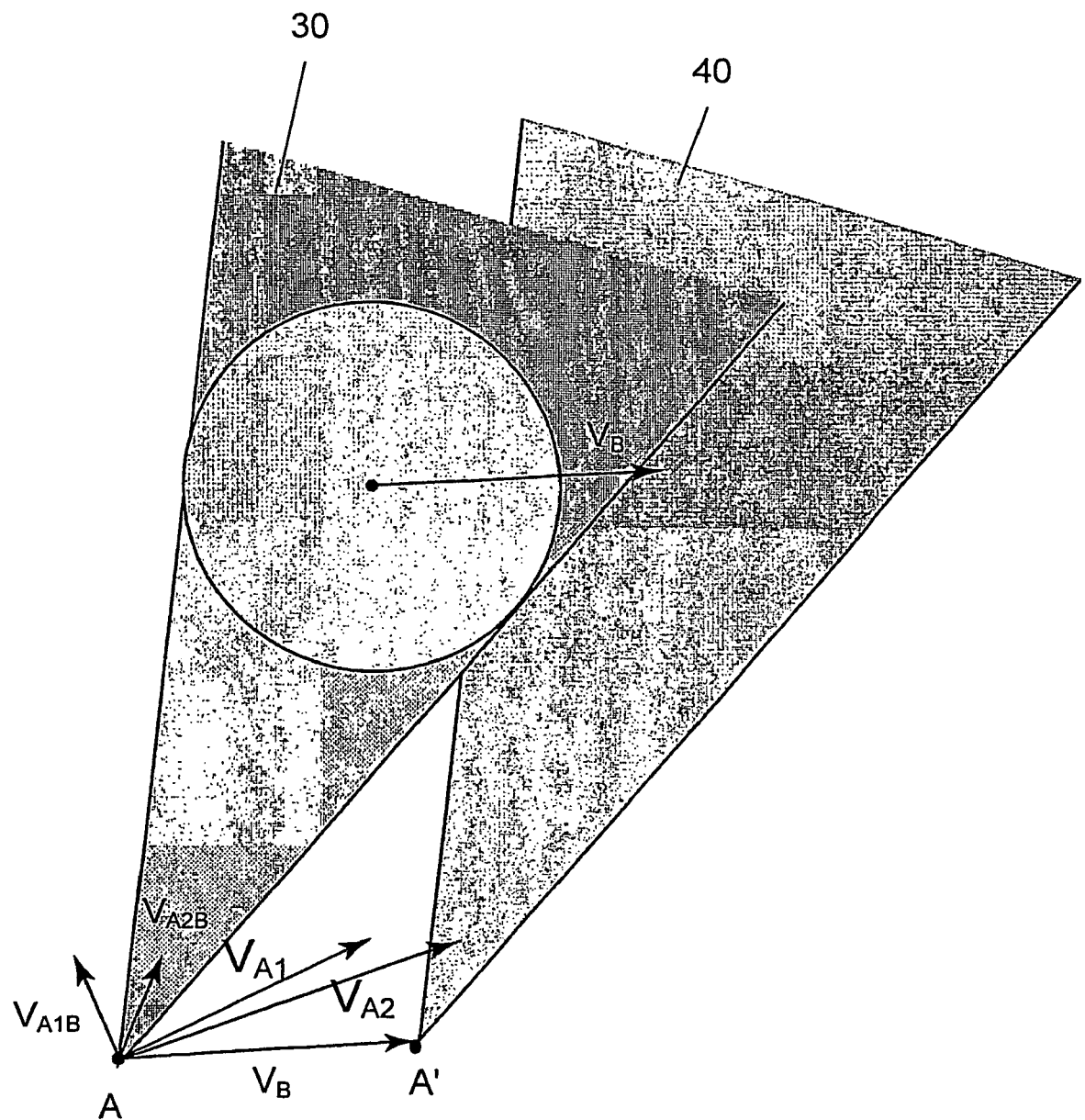

FIG. 10 illustrates the generation of a linear velocity obstacle (LVO). An LVO is representative of all possible absolute velocity vectors generated at the initial time which are associated with, and originate from, detected vehicle A and are liable to cause a collision with detected vehicle B. Since the detected vehicle is assumed to maintain a linear path at a constant velocity, the generated velocity obstacle is independent of time and its borders are straight lines linear). In order to determine an optimal driver initiated collision avoidance maneuver with respect to a plurality of detected vehicles, it is graphically advantageous to translate the generated relative collision cone 30. Translating relative collision cone 30 from A to point A' coinciding with the end of transposed absolute velocity vector $V_B$ produces the equivalent LVO 40. That is, LVO 40 is produced by adding velocity vector $V_B$ to each possible relative velocity vector that is included within relative velocity cone 30. While relative velocity vector $V_{A1B}$ does not penetrate relative velocity cone 30, absolute velocity vector $V_{A1}$ does not penetrate LVO 40. Conversely, while relative velocity vector $V_{A2B}$ penetrates relative velocity come 30, absolute velocity vector $V_{A2}$ penetrates LVO 40.

Figure 11:
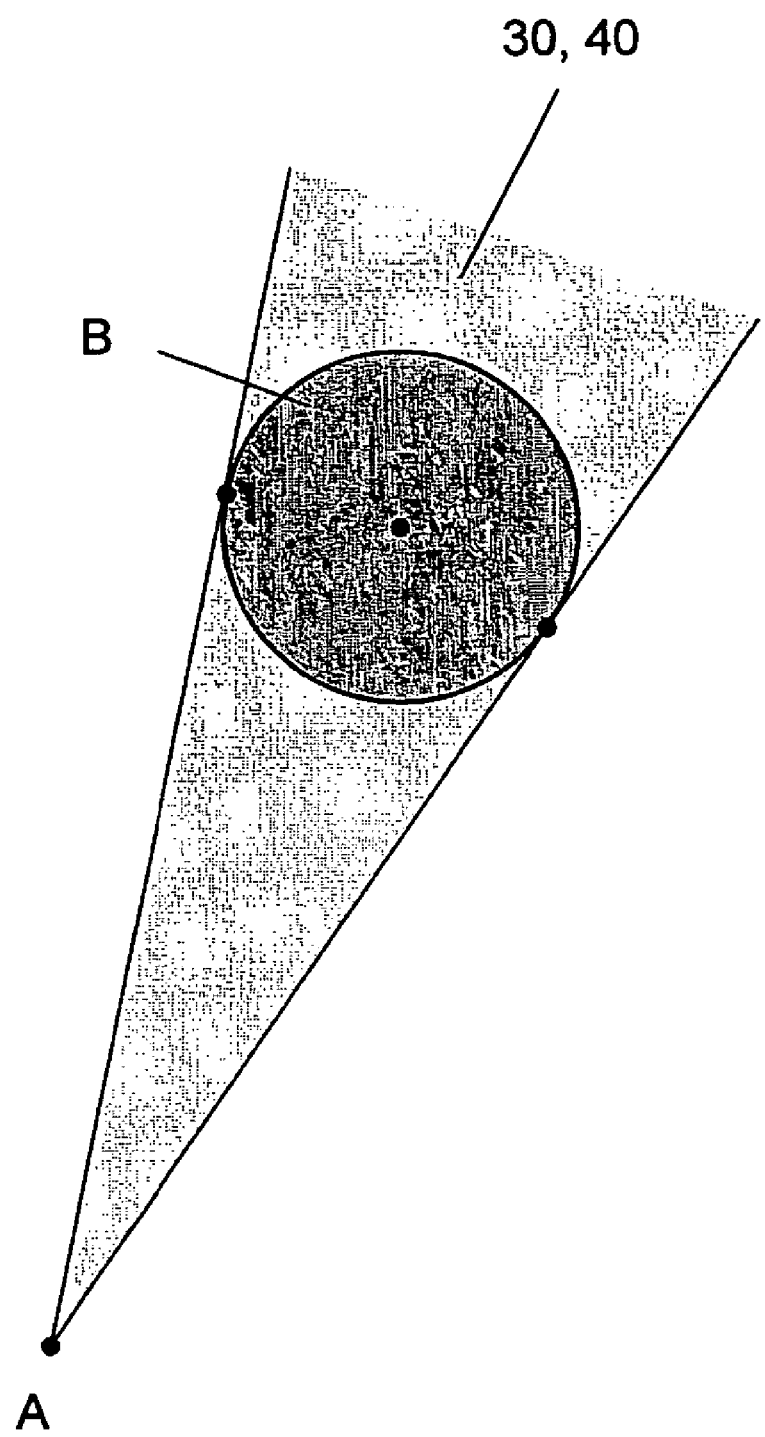

When detected that vehicle B is stationary, as shown in FIG. 11, i.e. $V_B$ is equal to 0, relative velocity cone 30 is identical to LVO 40.

Figure 12:
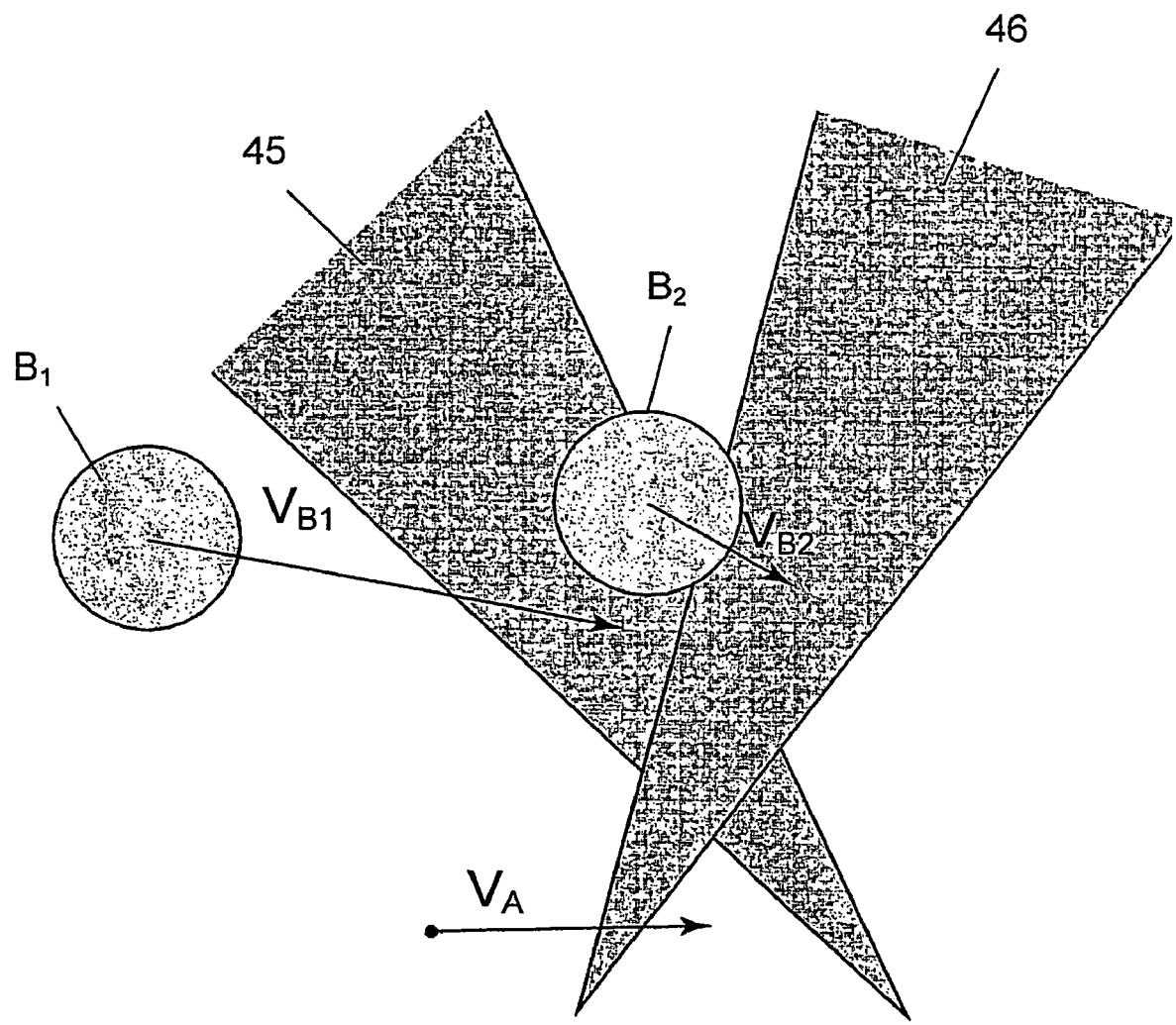

FIG. 12 illustrates a situation wherein two vehicles B1 and B2 being driven at a velocity vector of $V_{B1}$ and $V_{B2}$, respectively, are in the detection range of driven vehicle A. Two LVOs 45 and 46 are generated from velocity vectors $V_{B1}$ and $V_{B2}$, respectively. Absolute velocity vector $V_A$ is shown to pass through LVO 46, indicating that driven vehicle A will be driven faster than detected vehicle B2 and therefore will not collide therewith. The penetration of an LVO by an absolute velocity vector is indicative of the occurrence of a collision only when the magnitude of the vector is such that it ends inside LVO 45. The end of absolute velocity vector $V_A$ is outside LVO 45 and therefore, will not collide with detected vehicle B1.

Figure 13:
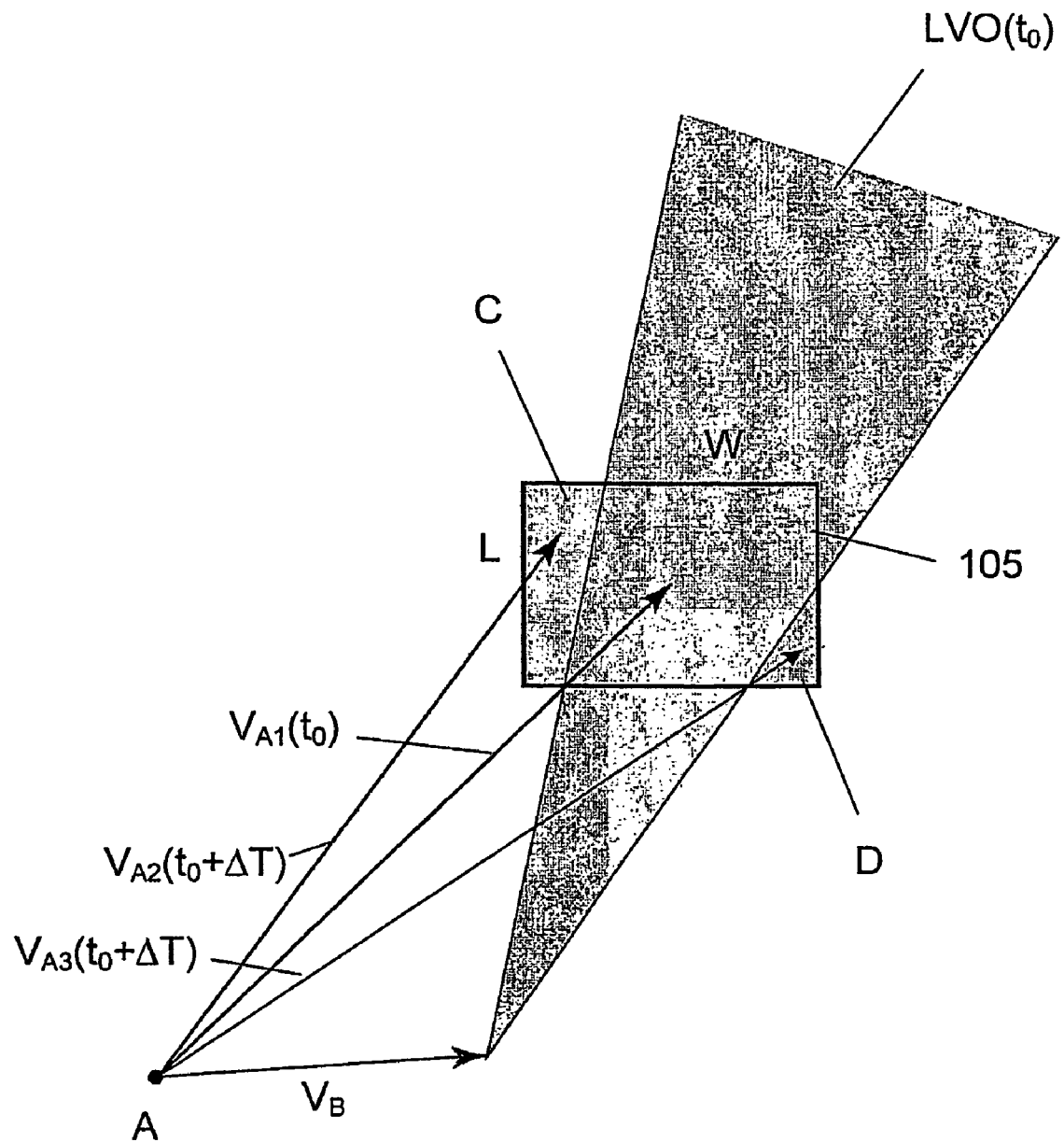
Figure 14:
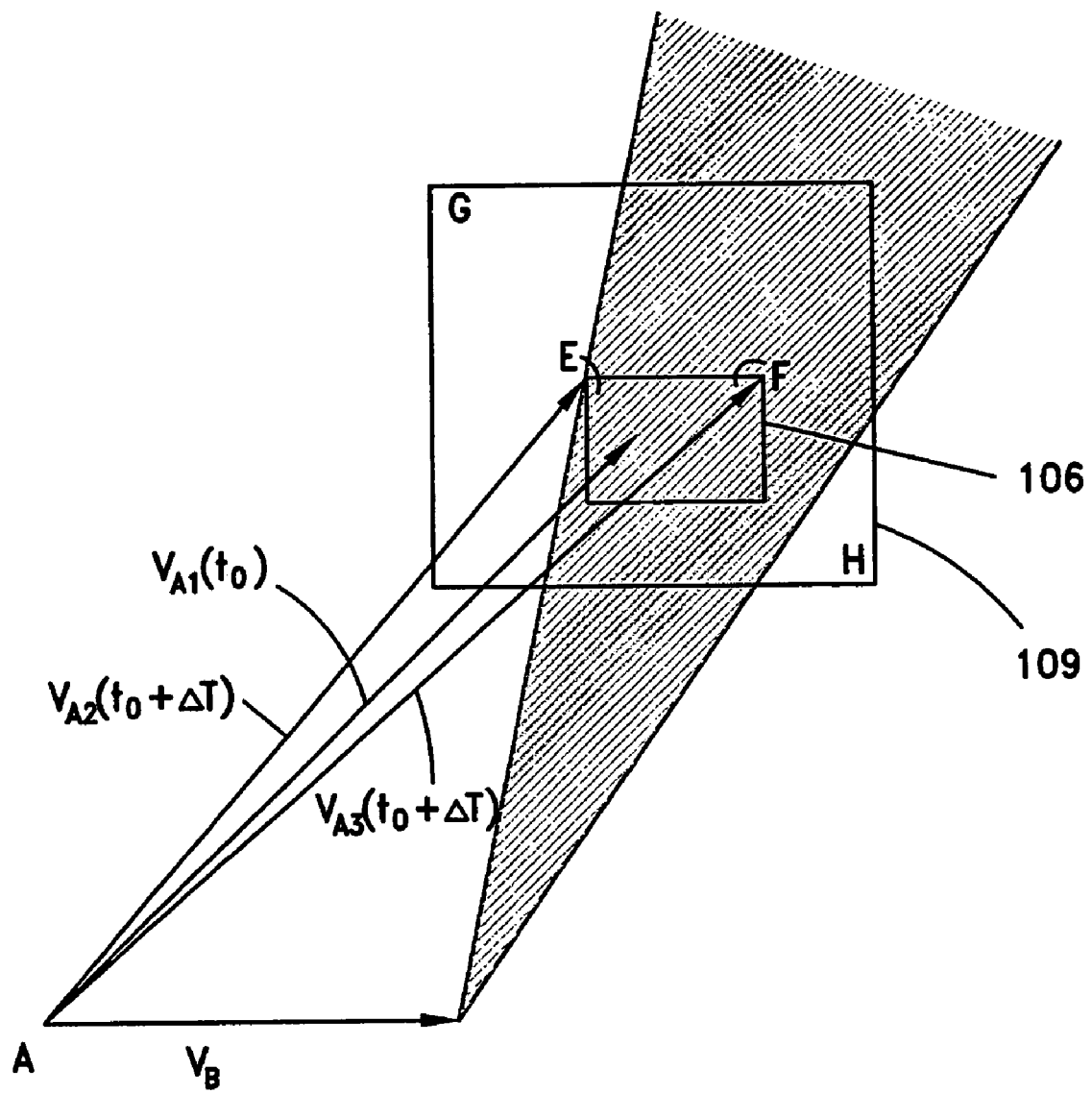

FIGS. 13 and 14 illustrate another embodiment of the invention wherein iterations of driver initiated collision avoidance or collision mitigating maneuvers are performed, such that a most optimal collision avoidance maneuver (MOCAM) or most optimal collision mitigating maneuver (MOCMT) is determined for each of a plurality of time intervals (each of which is referred to herein as a "performance time interval"). In order to determine the MOCAM or MOCMT for a given performance time interval, a velocity frame is generated which delimits the range of velocity vectors which is attainable by the drives vehicle in a subsequent performance time interval. The change in velocity vector which is attainable by the driven vehicle in a performance time interval is a function of the dynamic constraints thereof such as acceleration and deceleration, road conditions, and driver reaction time. A suitable performance time interval, which defines the size of a corresponding velocity frame, is one that is sufficiently short so that the driven and detected vehicles move insignificantly within the given performance time interval $\Delta T$, yet is sufficiently long so as to allow a driver to change the instantaneous velocity vector of the vehicle. In this embodiment, the driven vehicle is directed, in accordance with the determined MOCAM or MOCMT, to a point included within the velocity frame.

In FIG. 13, an exemplary rectangular velocity frame 105 is illustrated. Velocity frame 105 is generated after the generation of a linear velocity obstacle at the initial time $t_o$, which is designated as $LVO(t_o)$. $LVO(t_o)$ is based on absolute velocity vector $V_B(t_o)$ and the locations of both driven vehicle A and detected vehicle B at $t_o$. Velocity frame 105 is representative of the range of absolute velocity vectors attainable by driven vehicle A during the initial performance time interval, which is referred to by $t_o+\Delta T$. It will be appreciated that the shape and size of the velocity frame 105 are approximated by a rectangle, but in reality, it may assume a different shape, depending on e.g., vehicle characteristics (e.g., steering capability as well as kinematic and dynamic parameters.

A collision cannot be avoided if the driven vehicle continues to advance at a velocity vector $V_{A1}(t_o)$ during the initial performance time interval. The region between the adjacent borders of the velocity frame and the LVO is representative of the range of velocity vectors generated within a performance time interval $\Delta T$ by which a collision may be avoided. In the example of FIG. 13, the width of velocity frame 105 is greater than that of the LVO in regions C and D, indicating that a velocity vector coinciding with region C or D will result in collision-free motion. Accordingly, the velocity vector of the driven vehicle may be changed from $V_{A1}(t_o)$ to $V_{A2}(t_o+\Delta T)$, which penetrates region C, or to $V_{A3}(t_o\Delta T)$, which penetrates region D. However, the choice of velocity vector $V_{A2}(t_o+\Delta T)$ is preferable since region C which is penetrated thereby encompasses a greater range of velocity vectors than region D. Many of the velocity vectors encompassed by region C are also more distantly separated from the borders of the LVO than those encompassed by region D. $V_{A2}(t_o+\Delta T)$ penetrating region C therefore presents a velocity vector having a lower risk of collision due to human error than $V_{A3}(t_o+\Delta T)$. In addition, the selection between $V_{A3}$ and $V_{A1}$ also determines the way vehicle A will pass in front or behind vehicle B, respectively. Reference to a velocity frame 105 therefore assists a driver in choosing a change in a vehicular velocity vector which is suitable for avoiding a collision.

FIG. 14 illustrates a situation wherein the generated velocity frame 106 is completely encompassed by the LVO, indicating that the corresponding driven vehicle can attain a smaller change in its absolute velocity vector $V_{A1}(t_o)$ during a performance time interval $\Delta T$ than that associated with velocity frame 105 of FIG. 13. Since velocity frame 106 is completely encompassed by the LVO, selecting a velocity being within this frame may eventually result in a collision. However, $V_{A2}(t_o+\Delta T)$ is preferable than $V_{A3}(t_o+\Delta T)$, since region E of velocity frame penetrated thereby is much closer to the border of the LVO and thus improves the chance to find a collision free velocity within the next $\Delta T$. Therefore, velocity frame 106 is also indicative of the most optimal collision mitigating maneuver.

In another embodiment of the invention, an LVO is repeatedly regenerated during time intervals shorter than the selected performance time interval, to take into account abrupt changes in motion by the driven vehicle and/or the detected vehicles. Such a time interval is herein referred to as a "sampling time interval" and designated as $\Delta t$. The configuration of an LVO may be considerably altered after one or two sampling time intervals due an abrupt change in motion, such as acceleration or a lane change maneuver, and therefore may more accurately reflect an optimal driver initiated collision avoidance or collision mitigating maneuver.

It will be appreciated that the generation of a velocity frame during a performance time interval is independent of a sampling time interval during which an LVO is generated. Therefore, a velocity frame generated in the vicinity of the end of velocity vector $V_{A1}(t_o)$ may be superimposed over a plurality of LVOs, e.g. $LVO(t_o+\Delta t)$, $LVO(t_o+2\Delta t)$, each of which is generated one after the other, until the conclusion of the selected performance time interval $\Delta T$, and may reveal different possible driver initiated collision avoidance or collision mitigating maneuvers. The MOCAM or MOCMT are determined based on the plurality of LVOs which are generated during the selected performance time interval. At the conclusion of the selected performance time interval, another velocity frame is generated which is based on the instantaneous velocity vectors of the driven and detected vehicles.

Even though velocity frame 106 is completely encompassed by the LVO, a collision free velocity may be selected if a larger performance time interval is selected. By generating an enlarged velocity frame 109, which is indicative of a longer performance time interval of e.g. $t_o+\Delta 3T$, the velocity frame may extend outwardly from the borders of the instantaneously generated LVO, indicating that regions G and H would result in collision-free motion. Considerable variations in a generated LVO are foreseeable during such a longer performance time interval. As a result, a collision avoidance maneuver during one sampling time interval may prove to be a collision inducing maneuver during another sampling time interval. Accordingly, the navigational system determines the MOCAM or MOCMT based on the ratio between $\Delta T$ and $\Delta t$.

Non-Linear Velocity Obstacles (NLVOs)

Although using LVOs for determining the possibilities for performing maneuvers and for providing the driver a set of warnings with escalating severity levels is efficient, an LVO is based on the assumption that each detected vehicle moves in an essentially linear path and has a substantially constant velocity. However, if the path of these obstacles is non-linear, a similar accurate set of warnings may be provided by generating an NLVO.

Figure 15:
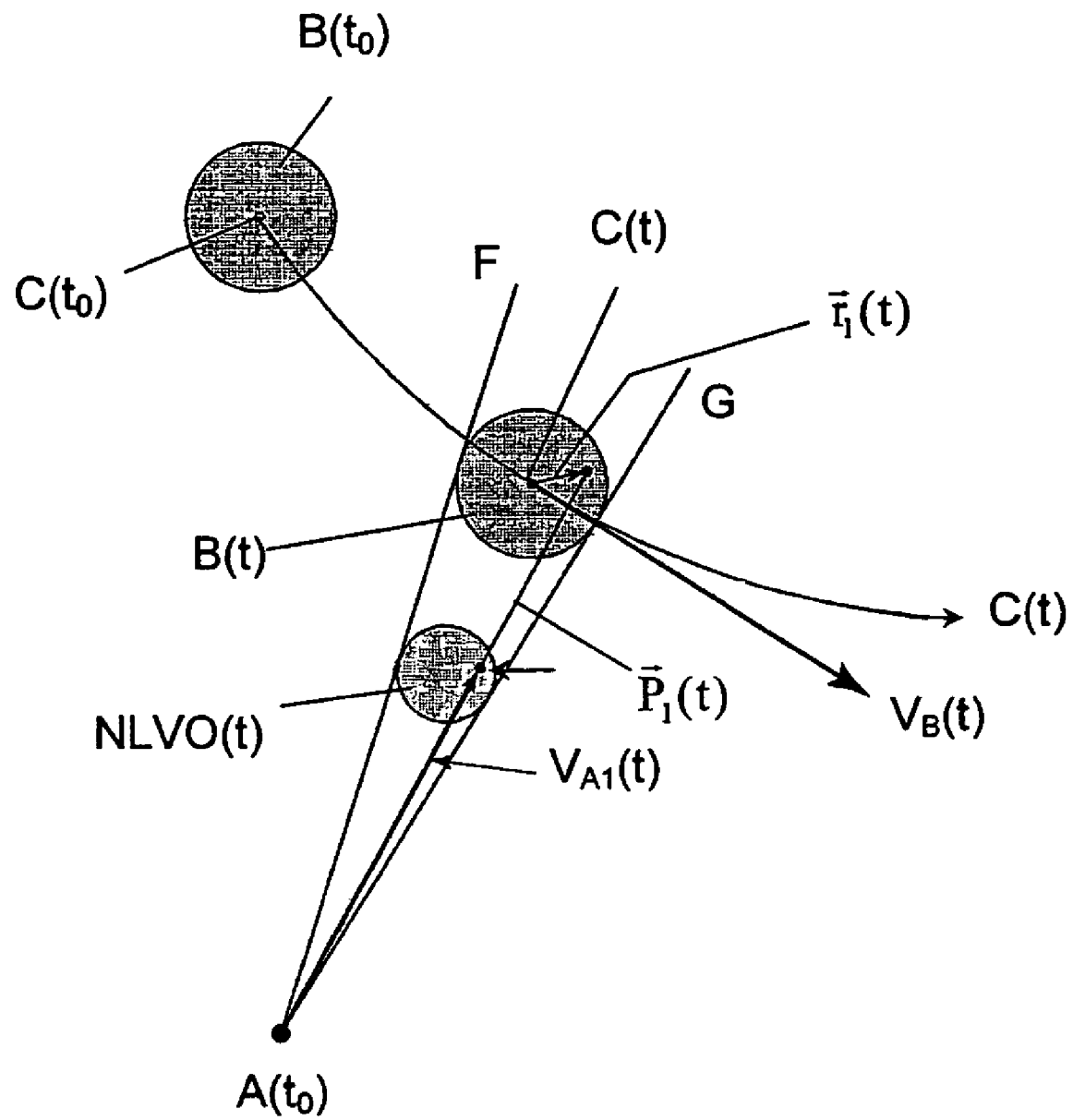

FIG. 15 illustrates a situation wherein a detected vehicle B moves along a curved path C(t), which represents the location of the geometrical center thereof as a function of time. NLVOs indicate at an initial time $t_o$, similar to LVOs, whether a collision is impending, albeit within the time horizon $t_h$. In order generate the NLVO, it is required to determine a range of linear velocity vectors $V_A(t_o)$ generated at the initial time, for which driven vehicle A will collide with detected vehicle B at time t. Such a range of collision inducing velocity vectors is represented by NLVO(t).

At initial time $t_0$, detected vehicle B is located at point $C(t_0)$. At time t, detected vehicle B is located at C(t). The geometrical dimensions of detected vehicle B are represented by enlarged circle B(t), which is the collection of all points P(t) at time t. For a selected point $P_1(t)$, it is possible to determine the distance vector $P_1(t)$ originating from driven vehicle $A(t_0)$. $\vec{V}_a(t)$ is a velocity vector of A at time $t_0$ that would result in a collision at time t with point $P_1(t)$. Note that $\vec{V}_a(t)$ has the same direction of $P_1(t)$. Therefore, since $P_1(t)$ represents a distance:

$$\vec{V}_a(t) = P_1(t_0)/t,$$

Substituting $P_1(t)$ by B(t) yields:

$$NLVO(t) = 1/t \cdot B(t).$$

Since B(t) is a collection of points, the enlarged circle B(t) is mapped, i.e. compressed, to another circle NLVO(t). The mapped circle NLVO(t) is generated within the cone bounded by lines tangent to the enlarged circle B(t) and originating from driven vehicle $A(t_0)$. NLVO(t) constitutes the instantaneous portion of the NLVO.

This mapping is repeated for different values of t. The result is a collection of different overlapping circles having a decreasing radius and distance from A, as the value of t increases.

If B'(t) represents the original geometry of vehicle B at time $t_o$, the collection of all points within the area of B'(t) is represented by the vector $\vec{r}(t)$, which is originated at the point C(t). Therefore, $$NLVO(t) = 1/t \cdot C(t) + 1/t \cdot B'(t)$$

Figure 16:
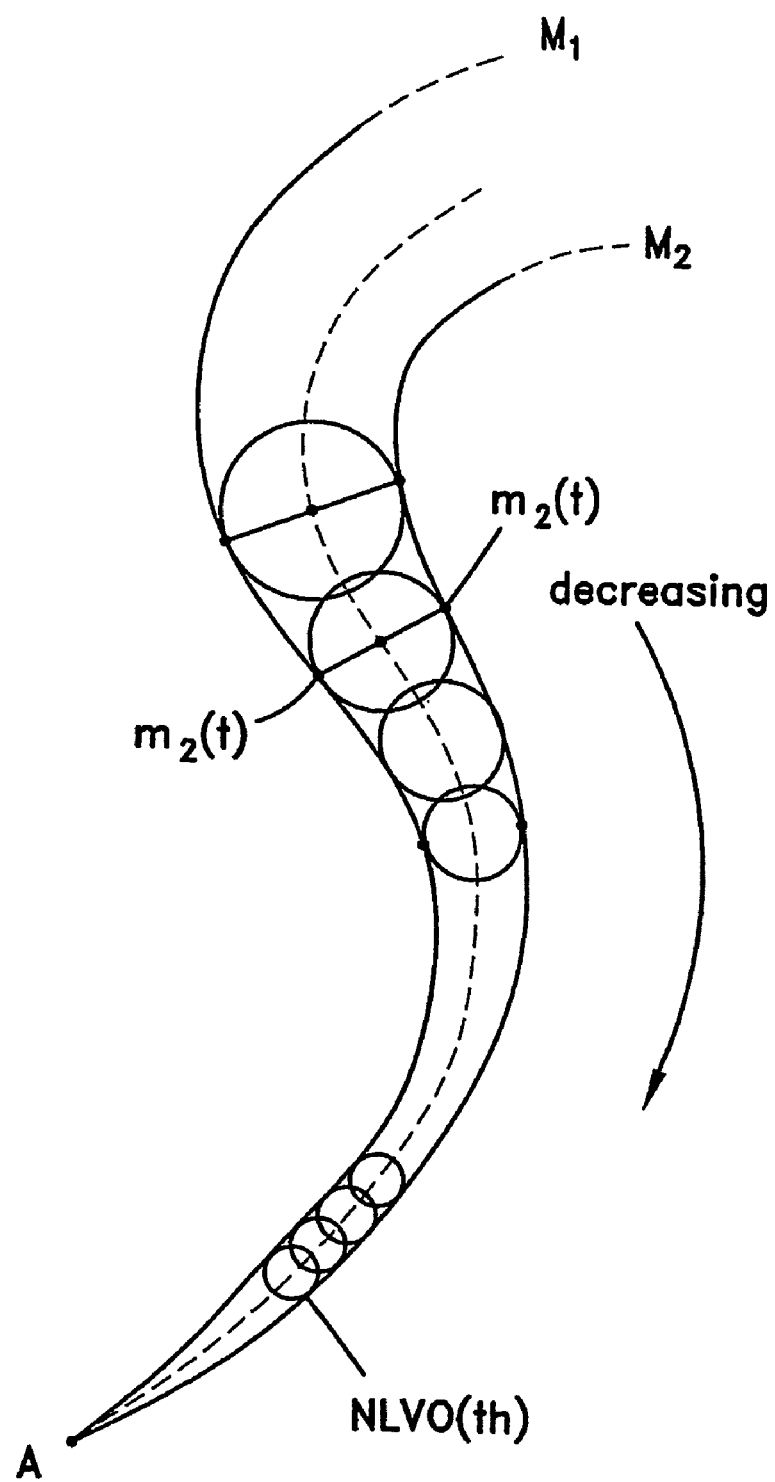

The resulting NLVO(t) for different values of C(t) is shown in FIG. 16. It can be seen that NLVO(t) is a curved cone where both the border lines $M_1$ and $M_2$ and the central axis of NLVO(t) converge to point A for increasing values of t. Border lines $M_1$ and $M_2$ are the collection of all points $m_1(t)$ and $m_2(t)$ which coincide with the circumference of a mapped circle and can be approximated to be essentially perpendicular to the central axis of NLVO(t). The curved velocity cone NLVO(T) is generally truncated at a time horizon $t_h$ corresponding to mapped circle $NLVO(t_h)$, which is representative of a collision that is of a negligible risk. $t_h$ is predetermined to be typically several times the response time of a driver and vehicle, so that the driver may respond sufficiently quickly in order to execute a collision avoidance maneuver. A NLVO(t) is similarly repeatedly generated during subsequent time intervals for stationary obstacles (e.g., trees, safety fences, stalled vehicles, etc.), as well as for moving obstacles (such as detected vehicles) in the detection range of A.

A rectangular velocity frame may be generated, as described hereinabove with respect to FIGS. 13 and 14, and superimposed over each NLVO which is generated during the selected performance time interval, in order to determine a MOCAM or MOCMT.

Figure 17:
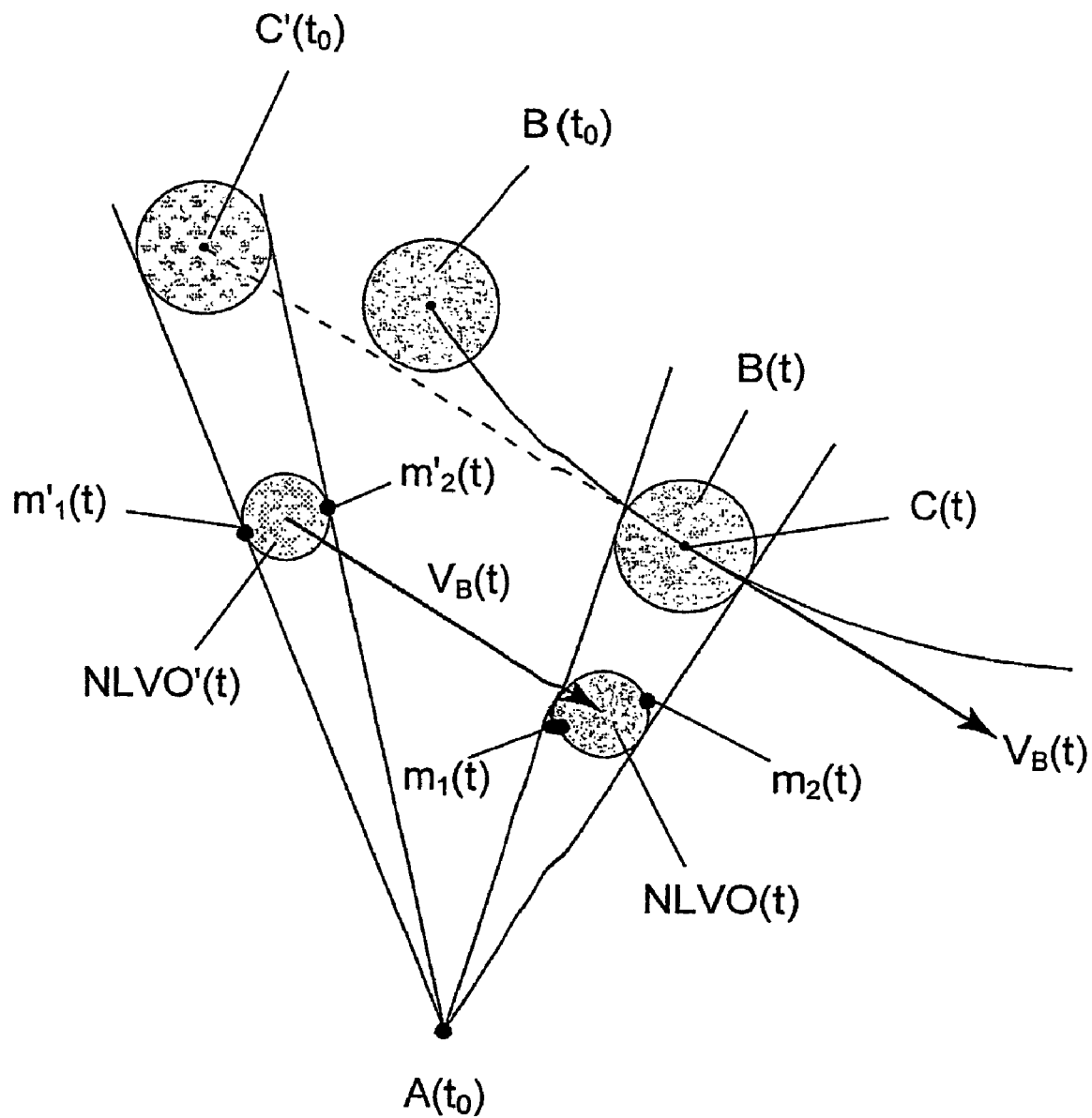

The border lines of NLVO(t) may be determined by generating a plurality of circles NLVO(t) for different values of t, up to $t_h$, as described hereinabove. However, in order to reduce the computational time, it is also possible to calculate only the values $m_1(t)$ and $m_2(t)$. This is shown in FIG. 17.

The linear velocity vector of detected vehicle B at point C(t) is the vector $\vec{V}_B(t)$. Assuming that detected vehicle B would have been moving towards point C(t) along a straight line (in the same direction of $\vec{V}_B(t)$), it is possible to determine a virtual location $C'(t_0)$, from which detected vehicle B would reach point C(t) if its velocity vector were a constant linear velocity vector $\vec{V}_B(t)$. In this case, the enlarged circle B(t) can be mapped to another circle $\nabla'_a(t) = NLVO'(t)$ using LVO (linear) considerations for that point. The resulting linear mapping is the two osculation points $m'_1(t)$ and $m'_2(t)$, which are then translated by $\vec{V}_B(t)$ back to the outline of NLVO(t). This way, only the osculation points $m_1(t)$ and $m_2(t)$ need to be calculated in order to obtain NLVO(t).

Figure 18:
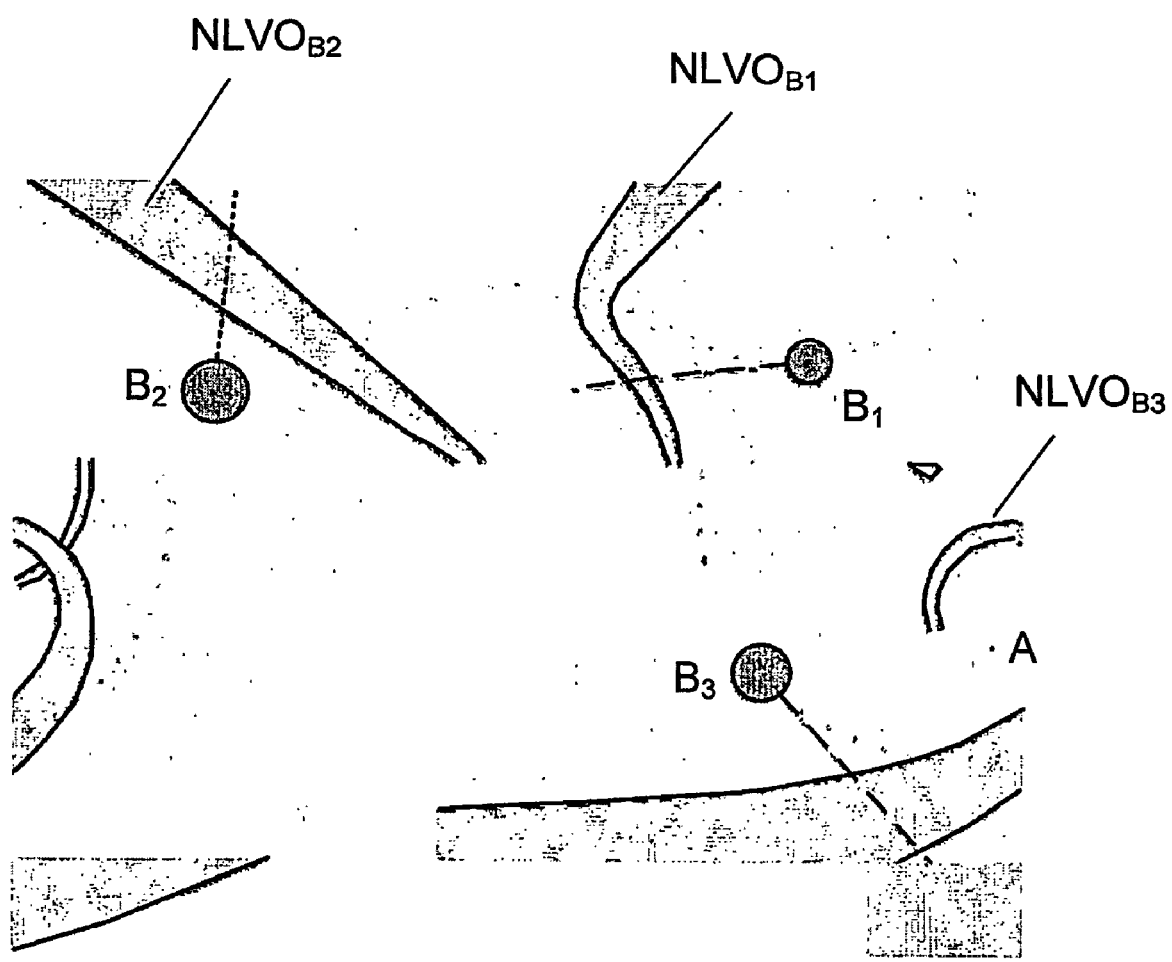

FIG. 18 shows a plurality of generated NLVOs that corresponds to detected vehicles B1-B3 in the vicinity of driven vehicle A.

Figure 19:
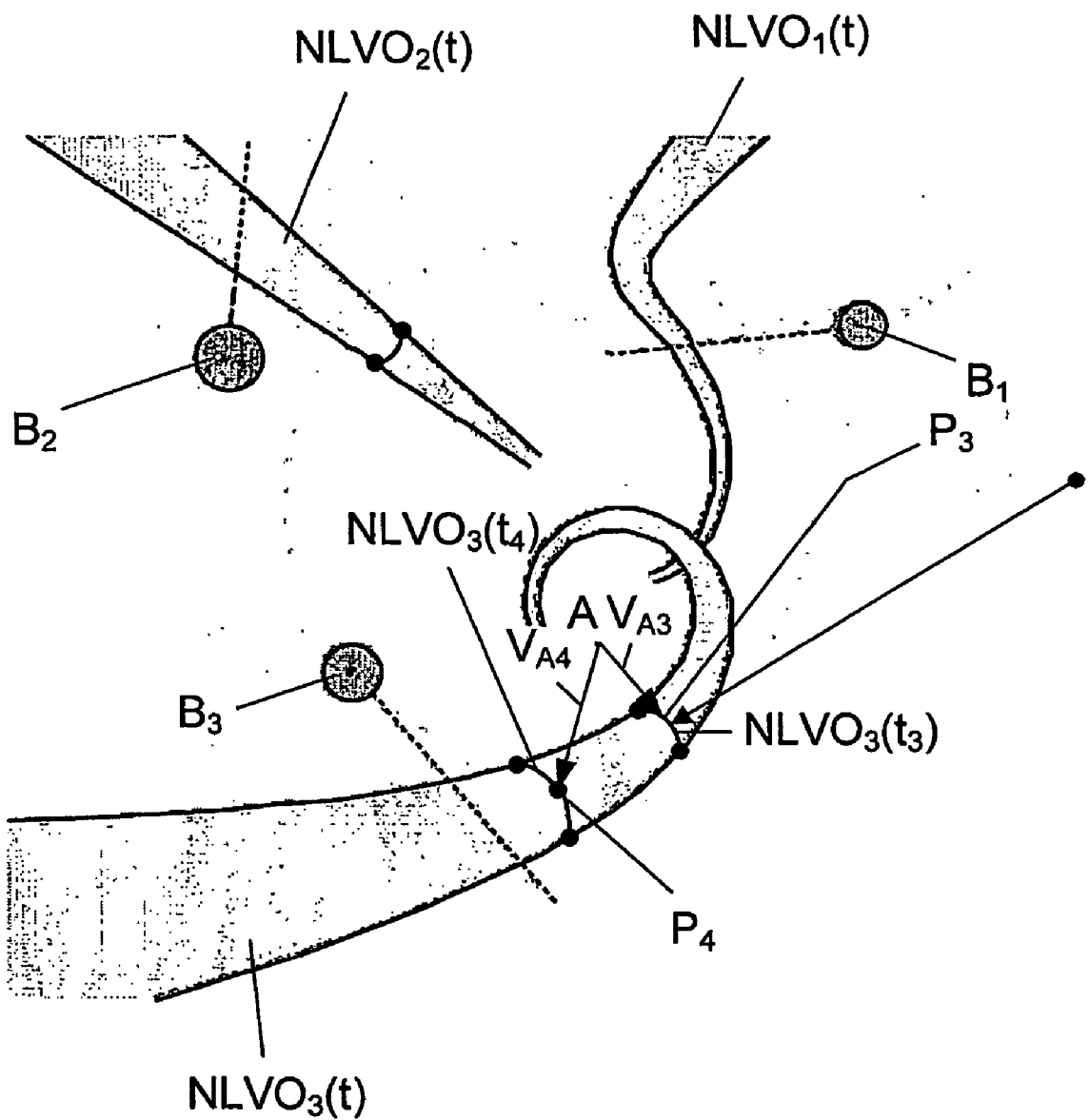

It is also very important to provide the driver with information regarding the time to collision when assessing the feasible velocity changes in each direction, while considering all the NLVOs in his vicinity. This feature is illustrated in FIG. 19. The three moving detected vehicles B1-B3 have three corresponding NLVOs, NLVO1(t)-NLVO3(t), respectively. From the location of A, two possible velocities are drawn, $\vec{V}_{a3}$ and $\vec{V}_{a4}$. $\vec{V}_{a3}$ penetrates NLVO3(t) at point P3 and $\vec{V}_{a4}$ penetrates NLVO3(t) at point P4. Each penetration point is on the circumference of a corresponding mapped circle, which represents a different time duration. In this example, $\vec{V}_{a3}$ penetrates NLVO3(t) at time duration t3 and $\vec{V}_{a4}$ penetrates NLVO3(t) at time duration t4. Therefore, the time to collision for each velocity can be directly obtained from the NLVOs, based on the time duration which generated the given mapped circle. Determination of the time to collision is extremely important in order to determine a driver initiated MOCAM or MOCMT. For example, when the navigational system determines that a collision is nearly or completely unavoidable, the time to collision provides the driver with an indication when a safety accessory, which will be described hereinafter, should be activated.

Figure 20:
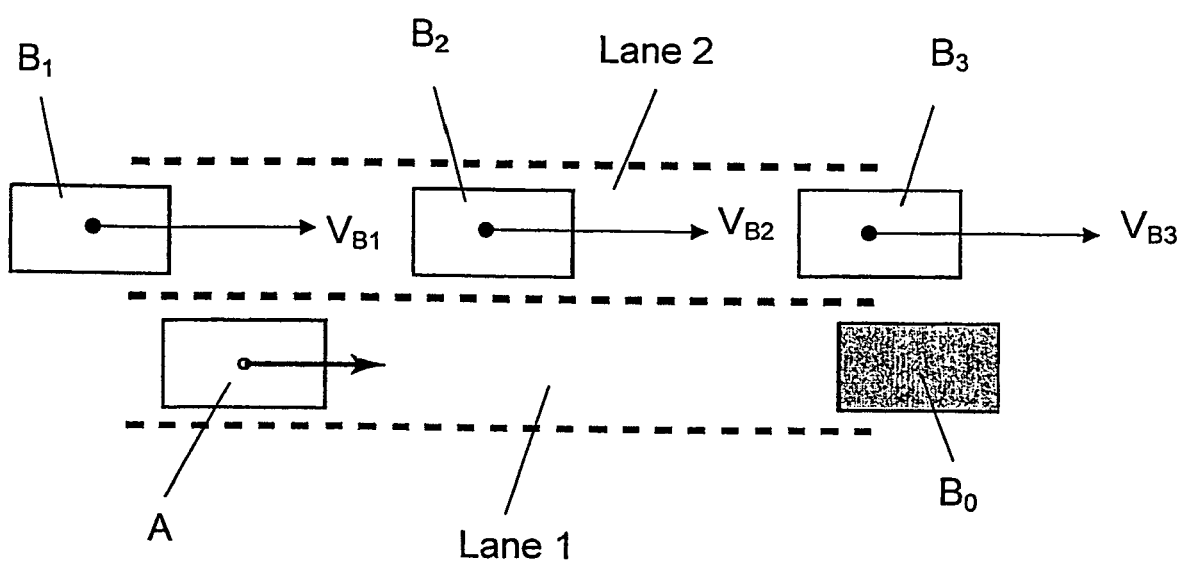

FIG. 20 schematically illustrates a common situation, in which a stationary obstacle blocks a lane of a road having two lanes. In this example, the moving direction is to the right. $B_0$ is a stalled vehicle in lane 1, A is the driven vehicle moving at a velocity vector of $\vec{V}_a$ and B1-B3 are the detected vehicles moving at linear velocity vectors of $\vec{V}_{b1}$, $\vec{V}_{b2}$ and $\vec{V}_{b3}$, respectively. As driven vehicle A proceeds towards stalled vehicle $B_0$, the navigational system transmits to the driver warnings of escalating severity. For example, when stalled vehicle $B_0$ is first detected, an LVO is generated and then truncated in accordance with a predetermined time horizon, so that a collision of negligible risk will not be taken into account. Velocity vector $V_A$ ends outside of the truncated LVO at the initial time, and therefore a warning will not be transmitted to the driver. At a subsequent time interval, whether a sampling time interval or a performance time interval, another truncated LVO is generated, which is truncated at a shorter time horizon, e.g. 15 seconds. The instantaneous velocity vector of the driven vehicle at this subsequent time interval ends on the border of the truncated LVO. A first warning signal is transmitted to the driver, informing him that he is too close to the obstacle. At the next subsequent time interval, an additional truncated LVO is generated, which is truncated at a shorter time horizon, e.g. 7 seconds. The instantaneous velocity vector of the driven vehicle at this next subsequent time interval ends on the border of the additional truncated LVO. A second warning signal of increased severity, e.g. "a collision is about to take place" is enunciated. Similarly, other warnings of escalating severity, such as accompanied with blinking lights or audible signals, are transmitted as the time to collision is continuously shortened. The warning signals are preferably not continuously transmitted, so that they will not be ignored by the driver.

Figure 21:
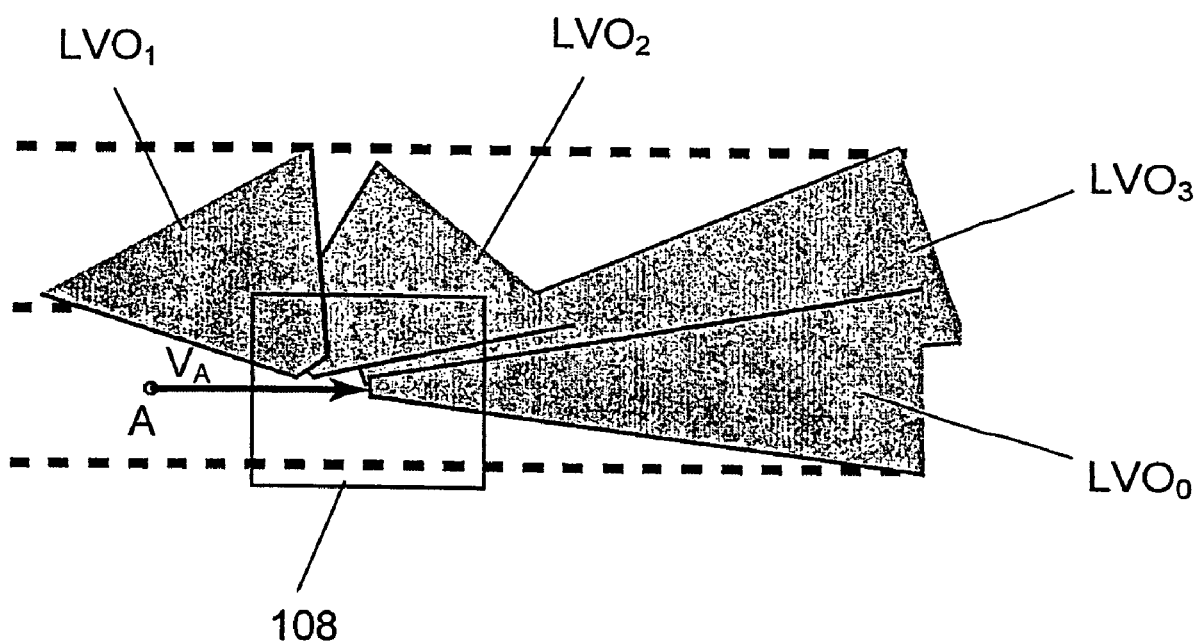

FIG. 21 schematically illustrates the generated LVOs of corresponding detected vehicles B0-B3. In this example, LVOs are generated, for the sake of simplicity, even though NLVOs can be generated as well. Rectangular velocity frame 108 shows the collection of feasible velocity changes that driven vehicle A can attain within time interval $t_o + \Delta t$. Here, the LVOs correspond to the longest time horizon Th0. As can be seen, collision is expected within Th0, since the driver cannot perform a lane changing collision avoidance maneuver since detected vehicles LVO0-LVO3 completely block lane 2. The generation of LVOs 1-3 can be repeated for shorter time horizons, such that the driver receives a more severe warning as a shorter time horizon is approached. On the other hand, a shorter time horizon may reveal new options for lane changing by virtue of the truncated LVOs. However, performance of collision avoidance maneuver in such a shorter time horizon needs to be performed quickly.

The driver may try to stop or may signal the drivers of B1-B3 by honking to open a greater gap between adjacent detected vehicles. By opening a greater gap between adjacent detected vehicles, the location of the LVOs that block lane 2 is shifted relative to lane 2.

Figures 22, 22A:
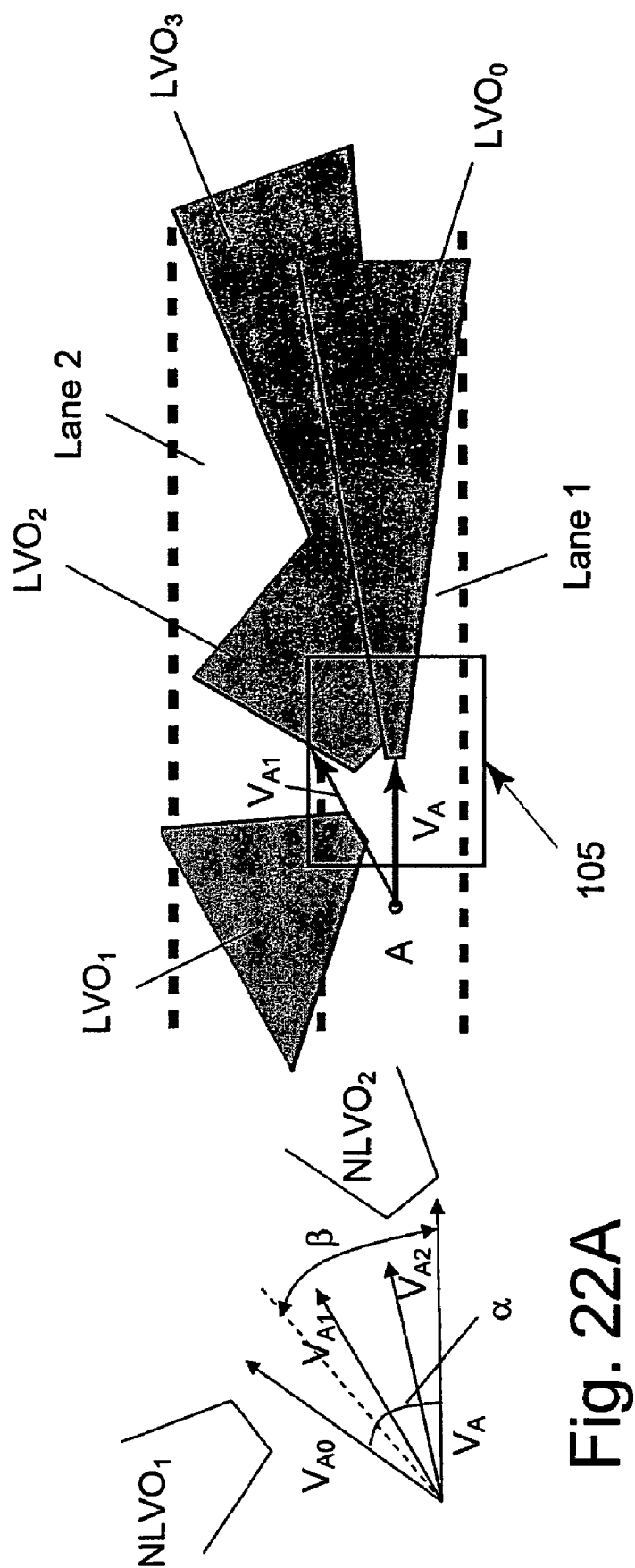

Such a greater gap is shown in FIG. 22. In the illustrated arrangement of LVOs, the driver of driven vehicle A may attempt a lane changing maneuver. In this example, the orientation of the LVOs is changed, so that the driver may try switching over to lane 2. If the gap between the LVOs is not sufficiently large to allow for a driver initiated collision avoidance maneuver, a slave mode may be initiated whereby the navigational system controls the driven vehicle just for the time needed to perform a lane change maneuver and then informs the driver by means of a visual or audible signal to take over again. For safety reasons, the driver always has the option to take over or to override the slave mode. If the driver wishes to change lane by changing the velocity to $\vec{V}_{a1}$, it is possible to define a range of collision-free angles (directions of $\vec{V}_{a1}$) α, representing, e.g., the angle between the extreme collision free velocities Va, as shown in FIG. 22A. A larger α indicates that Lane2 is more vacant. If α is too small and the system detects an intention of the driver to switch to lane 2 (e.g., by blinking), the driver will receive a warning signal, for indicating that lane 2 is not sufficiently vacant and that it is dangerous to try changing lane at that moment. Of course, there are dynamic limitations, such as the shortest path along which a lane change is still possible while reducing the risk of being forced off the road and loosing control of the vehicle.

These limitations further reduce the feasible range of collision-free angles from α to β(<α).

Figure 1:
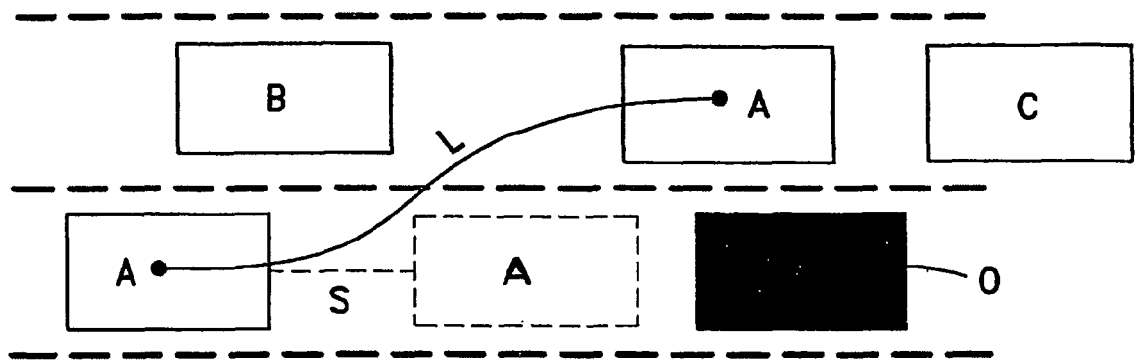
FIGS. 1-25 are illustrative examples of how to carry out the invention.
Figure 2:
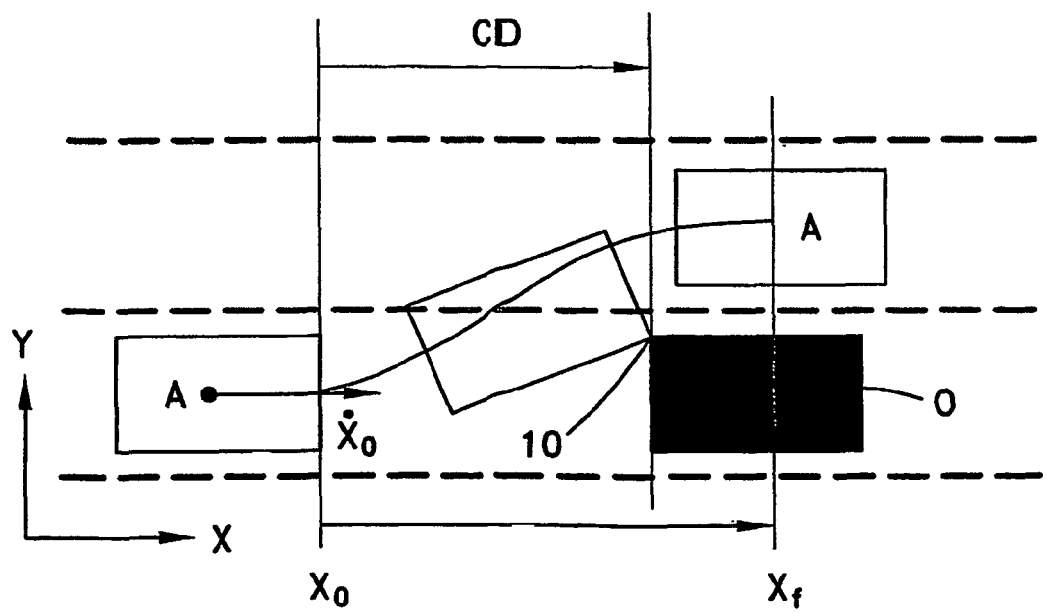
Figure 3:
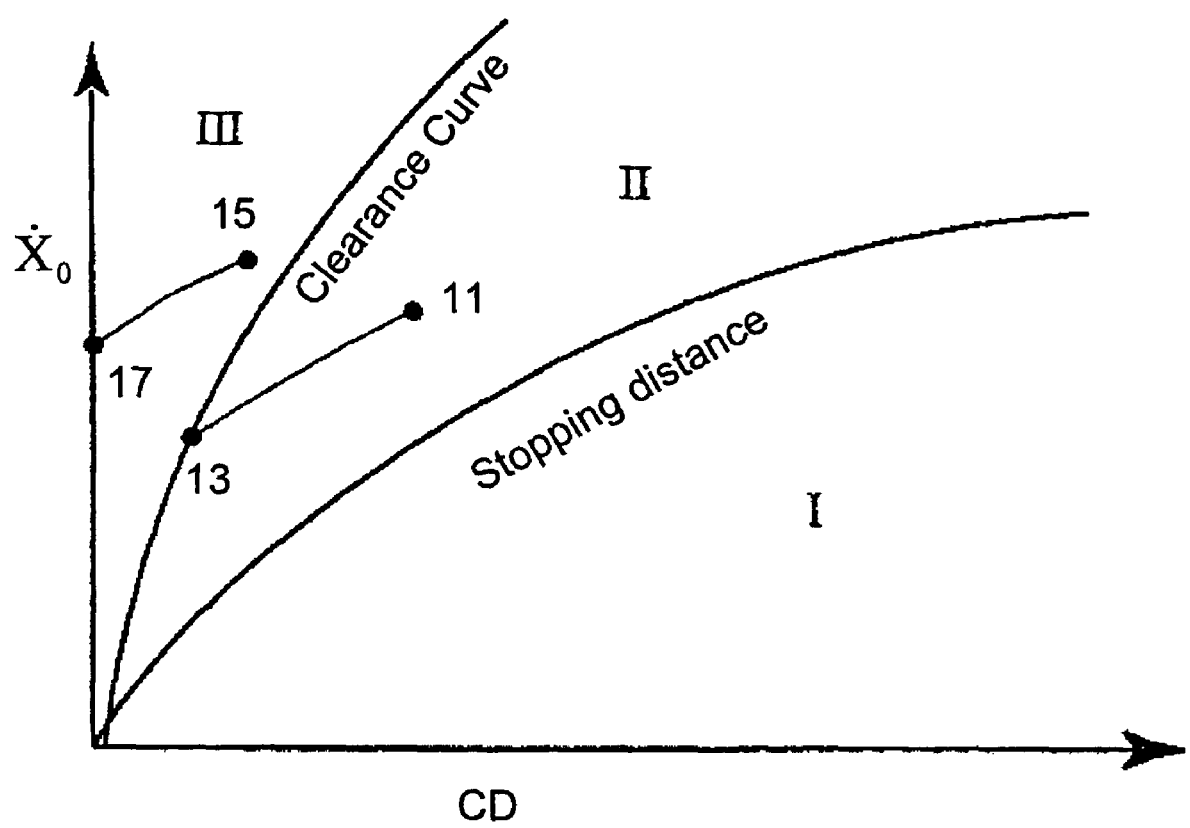
Figure 4:
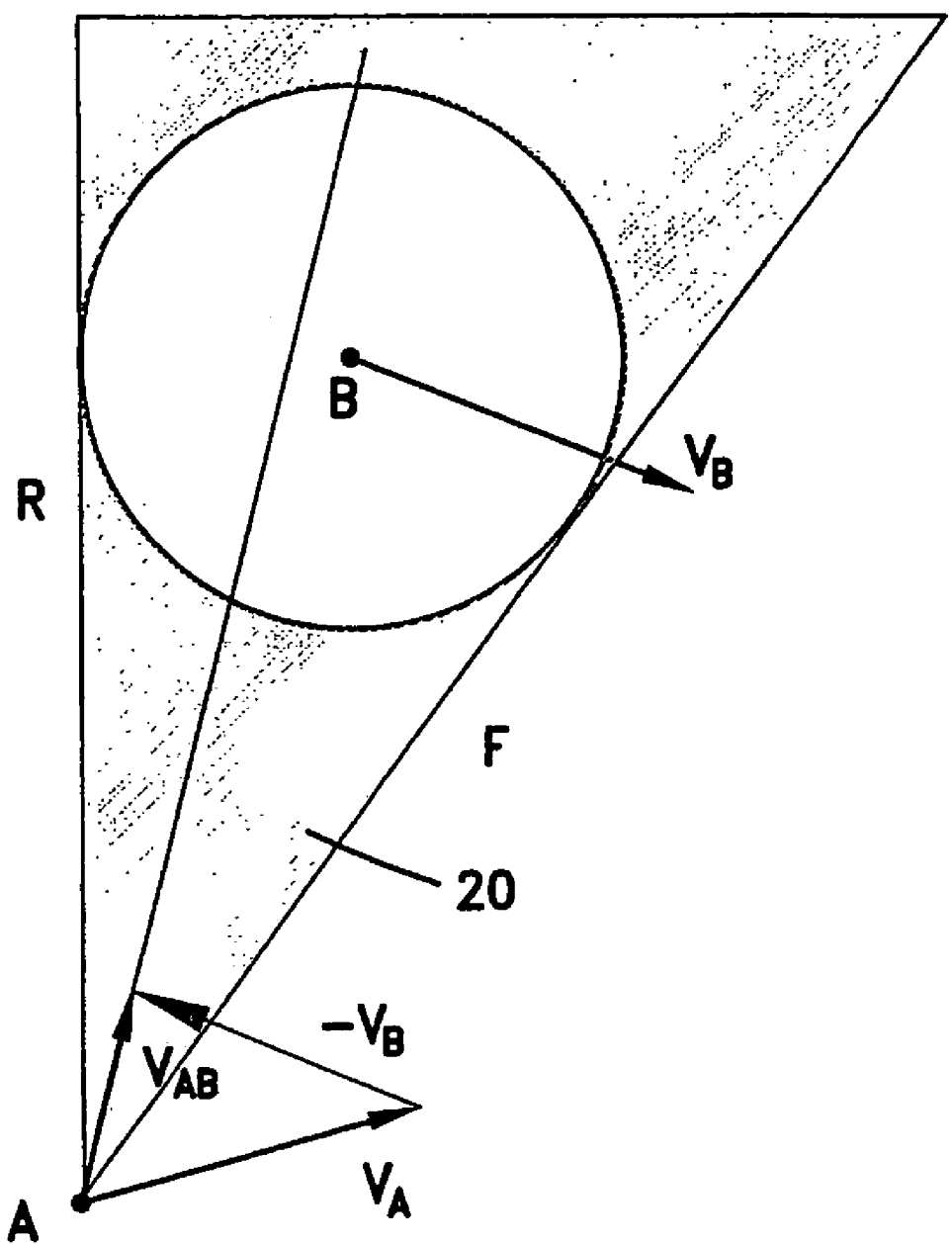
Figure 5:
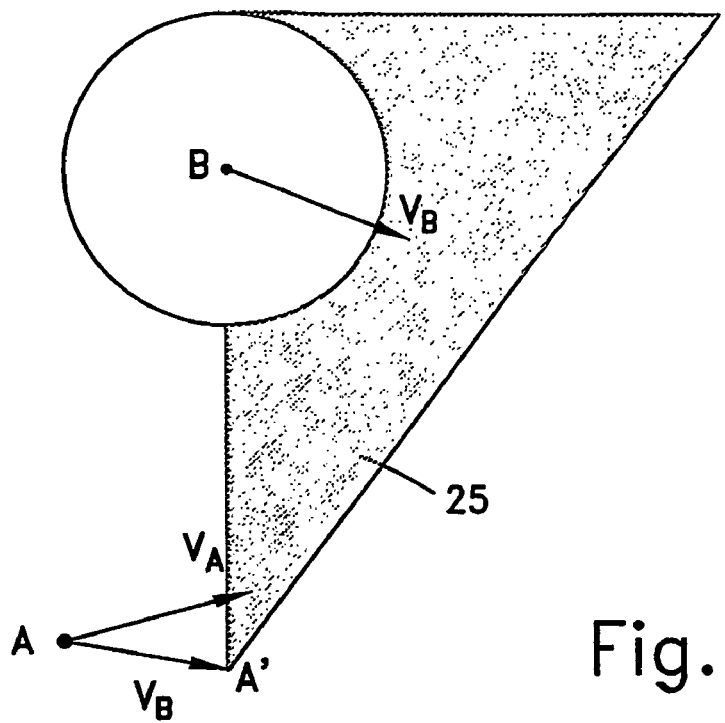
Figure 6:
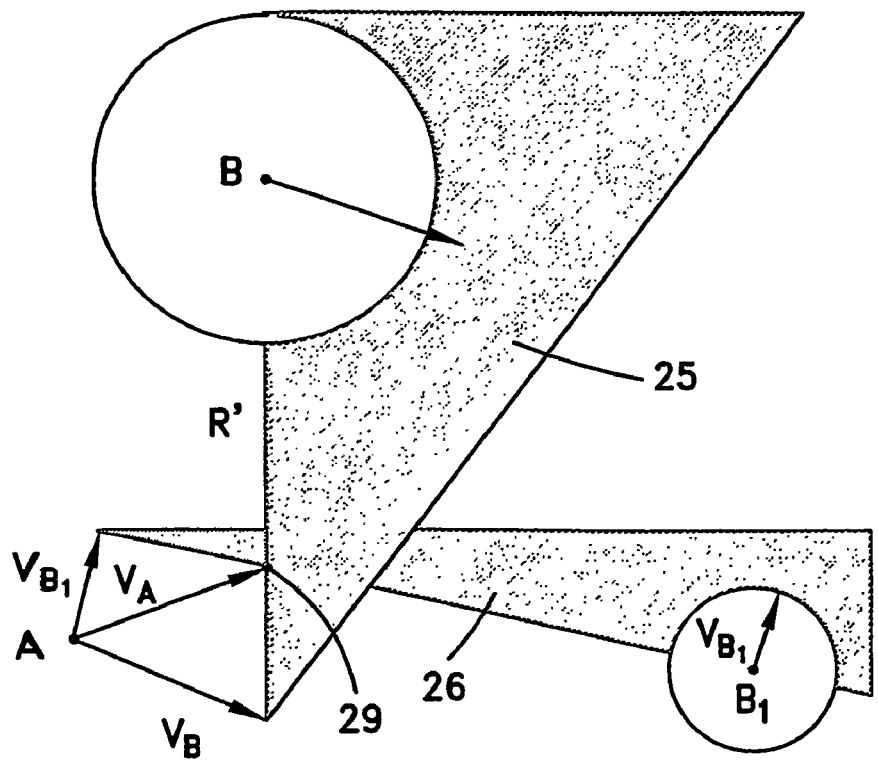
Figure 7:
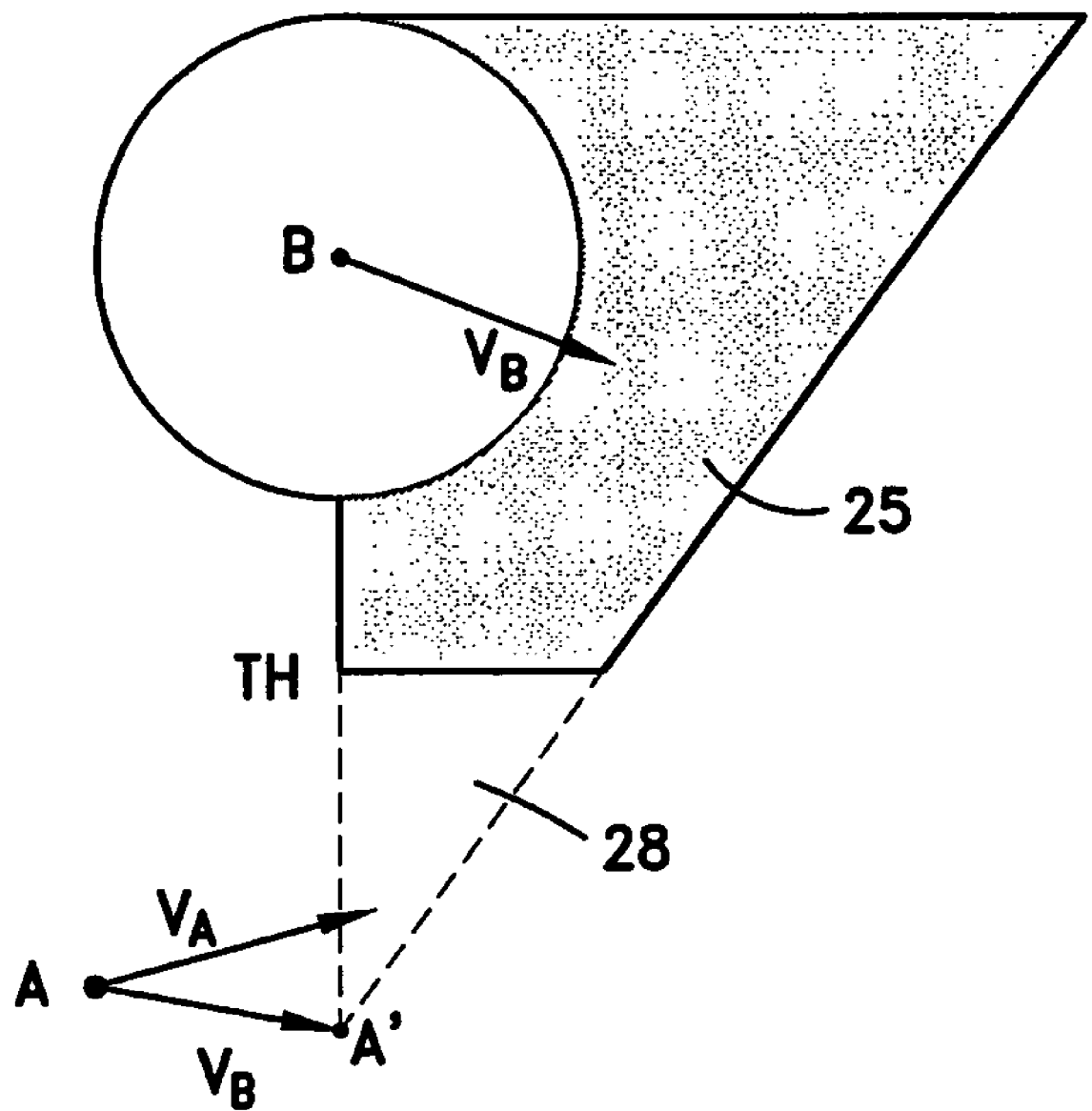

Looking back to FIG. 3, it is important to repeatedly consider the location of driven vehicle A, with respect to regions I-III, in combination with the value of α (or of β), so as to provide a safer and more accurate indication of a possible driver initiated collision avoidance maneuver. For example, if the current state (clearance distance and velocity vector) of driven vehicle A corresponds to region I, there are two options. The first one is to stop and the second one is to change lane. From FIG. 22, it is possible to detect that the driver of driven vehicle A becomes too close to obstacle B0. The navigational system then provides a warning that a possible lane change maneuver becomes less safe or even marginal. If the current state of driven vehicle A corresponds to region II, it is possible to provide warnings regarding the possibility of feasible lane change, depending on the location and velocity of the moving detected vehicles in the neighboring lane.

These calculations can be similarly repeated when NLVOs are generated for situations when the detected vehicles move along curved paths.

The Navigational System

Figure 23:
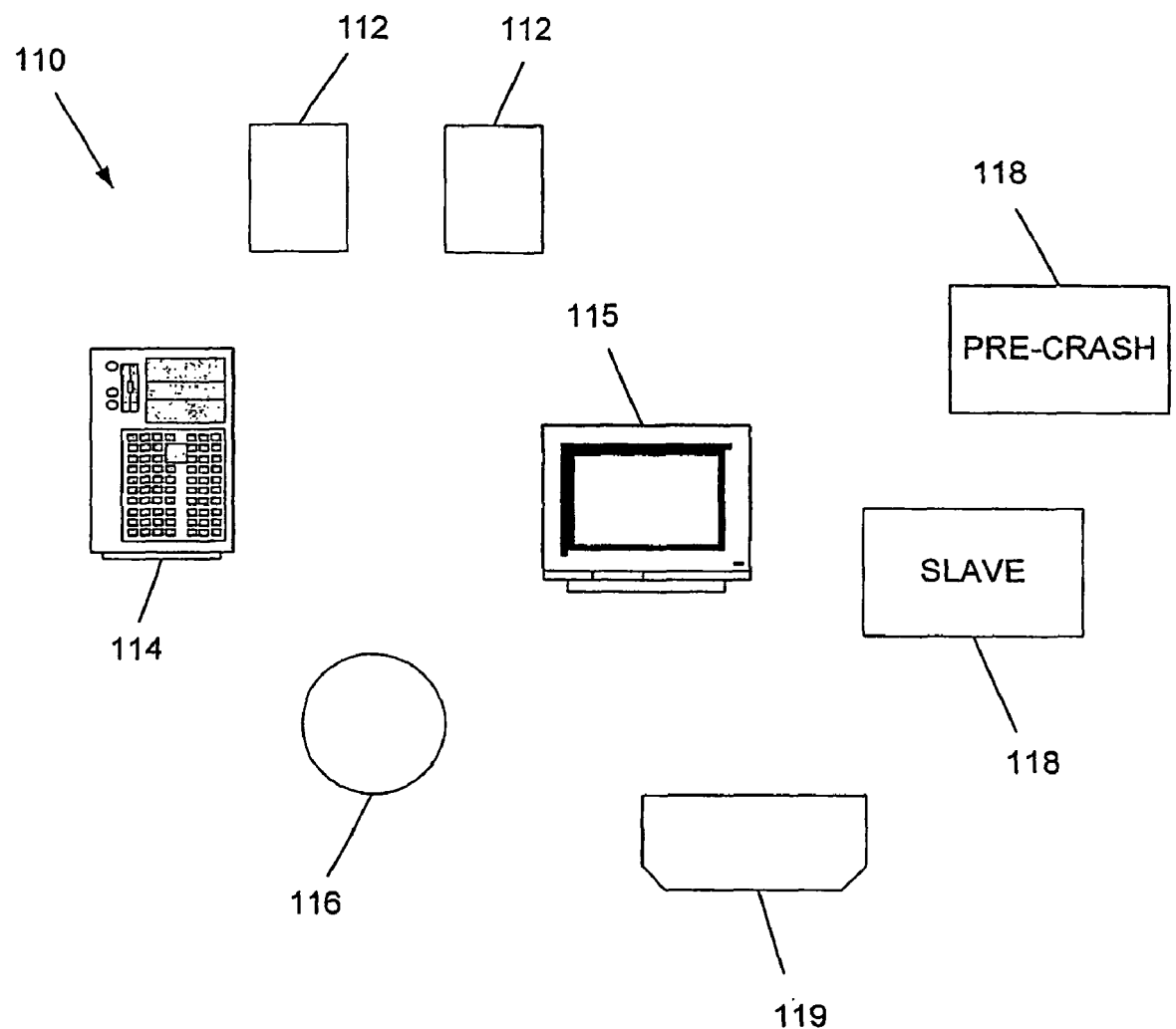

As shown in FIG. 23, the navigational system 110 comprises sensors 112 for determining the navigational conditions of the driven and detected vehicles, an on-board computer 114 for acquiring and processing data from sensors 112, display 115 for displaying information of interest to the driver such as a clearance curve for the instantaneous time interval, driver-assisted navigation recommendations, and warnings in an escalating degree of severity if the driven vehicle is approaching the time of collision, control components 116 for controlling the operation of the driven vehicle during a slave mode, indicators 118 for alerting the driver when the driven vehicle is set in e.g. a slave or pre-crash mode, and safety accessories 119 such as an airbag or an extendible bumper.

Figure 24:
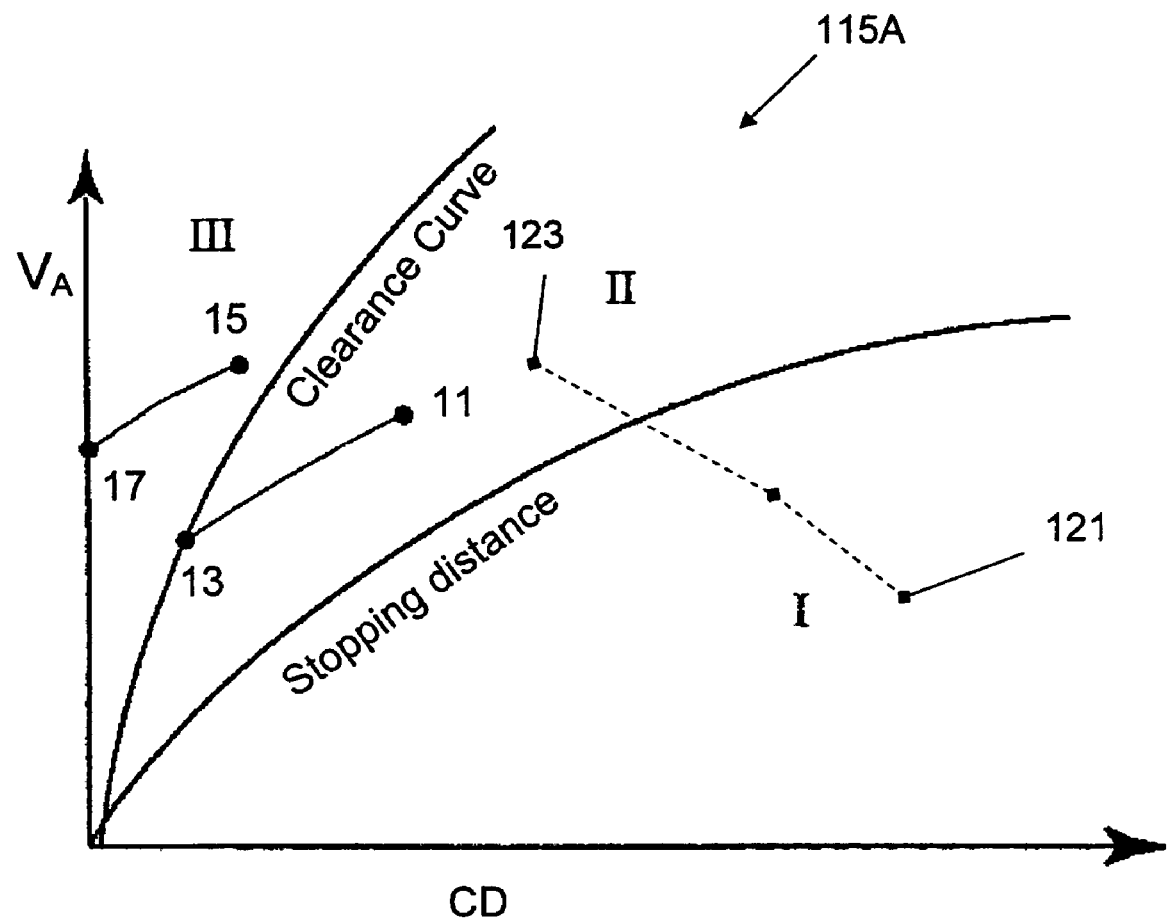

The display 115, e.g. a screen, is suitable for generating a repeatedly changing clearance curve. As shown in FIG. 24, display 115A displays the clearance and stopping distance curves on the dashboard of the driven vehicle. The instantaneous state of the driven vehicle is displayed e.g. at point 121. By viewing the state of the driven vehicle, the driver may advantageously notice which maneuver is be carried out. Therefore, if the state of the driven vehicle is in Region I, the driver knows that he should preferably brake rather than having to accelerate and pass a detected vehicle while changing its state to that of Region II. The driver also sees the instantaneous state of the driven vehicle relative to the clearance and stopping distance curves. It is also possible to show on display 115 the VOs of the neighboring vehicles, marked or unmarked as posing a collision thereat, as well as visual warning signs.

Previous maneuvers are also displayable. Although the instantaneous state of the driven vehicle is that of Region I, the driver may realize by viewing display 115A that the driven vehicle previously was in Region II, e.g. at point 123 and returned to Region I, indicating that the driven vehicle was unable to merge with vehicles in the neighboring lane due to the high volume of traffic in that lane. Other traffic tendencies are also noticeable such as noticeable dwelling time in both Regions I and II, indicating relative ease in passing from one lane to another.

As described hereinabove, reference to an absolute linear or non-linear velocity obstacle advantageously provides a fast, simple and reliable geometric method of determining whether the driven vehicle is liable to be involved in a collision when being driven at the instantaneous velocity vector.

When the navigational system determines that the driven vehicle is liable to be involved in a collision, a prioritized list of options is generated for each time interval and is subsequently displayed to the driver. One option may be to brake to 40 km/h and one may be to pass a car on the left at a speed of 90 km/h. This list of options is repeatedly updated after each subsequent time interval, in response to the maneuvers executed by the driven and detected vehicles.

Once the navigational system determines that the driver has selected the least favorable option resulting in a nearly inevitable collision, the navigational system sets the engine of the driven vehicle to a slave mode. In a slave mode, the navigational system, and not the driver, controls operation of the engine of the driven vehicle in such a way so as to avoid the nearly inevitable collision. Therefore, if the navigational system determines that e.g. the driven vehicle must advance to the left at a speed of 70 km/h, the depressing of the brake pedal will not cause the vehicle to decelerate. However, the driver is afforded the flexibility of overriding the slave mode, if he so desires, at any time, by noticing a collision avoidance maneuver which is unnoticed by the navigational system. The navigational system will immediately enunciate a warning that the driven vehicle is liable to be involved in a collision if the slave mode is overridden and that the driver is requested to reconsider his actions.

If the navigational system invokes the pre-crash mode wherein a crash is unavoidable, the most optimal collision mitigating maneuver is determined and executed by the driver or by the automatically controlled engine operating in a slave mode. In the pre-crash mode, the airbags may be slowly inflated within the interior of the driven vehicle in preparation of the imminent collision. In other embodiments, airbags are inflated externally to the driven vehicle or the bumpers are extended, in order to absorb the impact of the collision.

Figure 25:
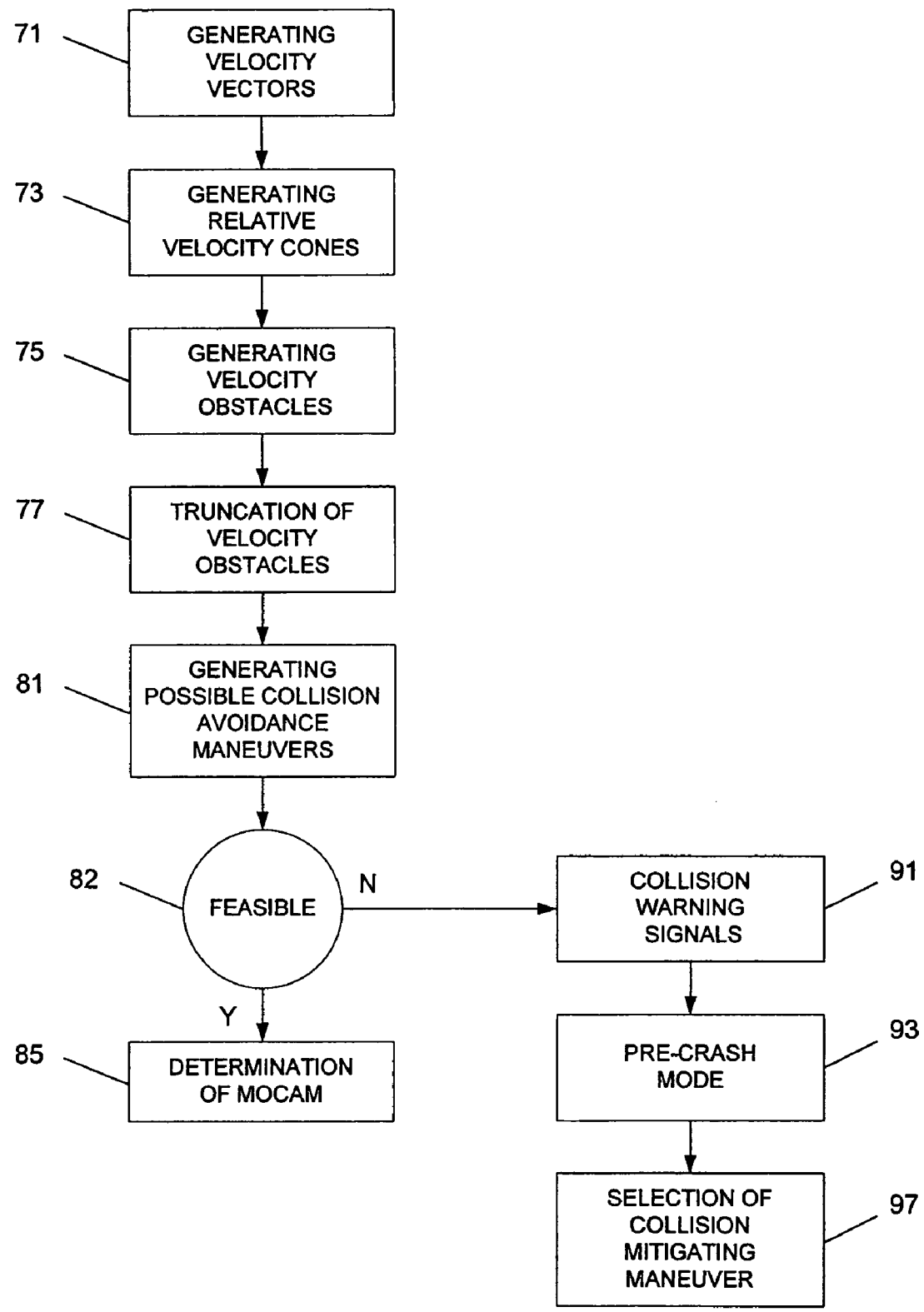

Generation of a velocity obstacle for each detected vehicle allows for the determination of the most optimal collision avoidance maneuver (MOCAM) of a driven vehicle. As illustrated in FIG. 25, the MOCAM of a driven vehicle is determined by first generating in step 71 the velocity vector of the driven vehicle and of each detected vehicle, with the relative separation of the origin of each velocity vector being proportional to the instantaneous relative separation of each vehicle at the time of detection, which constitutes the initial time of MOCAM determination. Each detected vehicle is indicated by a circle having a diameter which is representative of the relative size thereof. A relative velocity cone is then generated for each detected vehicle in step 73 having an apex coinciding with the position of the driven vehicle and bounded by lines which are tangent to the circle corresponding to each detected vehicle. Each collision cone is then added to the corresponding velocity vector of each detected vehicle, whereby each collision cone is translated a distance characteristic of the corresponding velocity vector to generate a velocity obstacle in step 75. A VO is representative of the range of absolute velocity vectors of the driven vehicle that would result in a collision with the corresponding detected vehicle. Each VO is truncated in step 77 at a predetermined time horizon, e.g. of 20 seconds, such that the remaining truncated portion of the VO is representative of a realistic time to collision with the driven vehicle. The overlapping of two adjacent VOs is indicative of a driven vehicle velocity vector which would result in a collision with one of the two corresponding detected vehicles. Therefore, each path from the driven vehicle which is unobstructed by an absolute velocity cone is representative of a possible driver initiated collision avoidance maneuver that is to coincide with the corresponding path. Possible driver initiated collision avoidance maneuvers are generated in step 81. The MOCAM is then determined in step 85 based on, for example, the unobstructed path having the broadest angular range or by means of a velocity frame.

The navigational system determines in step 82 if there exists any dynamically feasible driver initiated collision avoidance maneuver that can slow down or stop in lane, or merge with the neighboring traffic. If no feasible maneuver is found, then a collision warning signal is generated in step 91. The collision warning signal, which may be an audible signal or a visual signal which is displayable on the dashboard, alerts the driver that the driven car will be involved in a collision within the a time period less than that of the selected time horizon. The generation of a collision warning signal sets the driven car into a pre-crash mode in step 93, whereupon the driver is then urgently requested to decelerate the driven vehicle to a maximum extent, to minimize damage to the driven vehicle. During the pre-crash mode, an airbag system is activated, whereby airbags are inflated both within the interior of the vehicle to protect the passengers and at the exterior of the vehicle to minimize damage to the driven vehicle. It will be appreciated that a pre-crash mode will be invoked even if the driven vehicle does not initiate the collision, such as when a detected vehicle is about to cut in front of the driven vehicle from the right, at a distance of less than the minimum clearance distance of the driven vehicle.

During a pre-crash mode, the navigational system can select a collision mitigating maneuver in step 97. For example, if the driven vehicle is predicted to collide with either a car or with a truck, the navigational system transmits a signal which urgently requests the driver to perform a collision minimizing maneuver.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. Method for transmitting a warning signal to a driver of a driven vehicle regarding an impending collision with a moving and/or stationary object in the vicinity of said driven vehicle, comprising:
   a) providing said driven vehicle with means for obtaining updated data regarding, position, velocity vector and predicted moving path of each one of said moving and/or stationary objects in the vicinity of said driven vehicle;
   b) determining a series of one or more time horizons according to the characteristics of said vehicle and driver and the neighboring traffic;
   c) for a selected time horizon of said determined series of time horizons:
      c.1) generating a linear velocity obstacle (LVO) and/or non-linear velocity obstacle (NLVO) of each of said moving and/or stationary objects;
      c.2) selecting a sampling time interval $\Delta t$, during which an LVO and/or NLVO is generated;
      c.3) determining a range of feasible velocity vector changes for said driven vehicle that are attainable within a performance time interval $\Delta T$;
      c.4) providing the driver, after said sampling time interval, with information regarding the optimal feasible velocity vector changes for said performance time interval;
      c.5) obtaining dynamic parameters representing the movement of said driven vehicle within said performance time interval, and calculating an updated velocity vector for said driven vehicle;

c.6) generating a warning signal with the lowest severity level that reflects the relative imminence of collision with said moving and/or stationary objects in the vicinity of said driven vehicle and that corresponds to said selected time horizon whenever the updated velocity vector parameters reach at least one LVO or NLVO;

d) repeating steps c.1) to c.6) above for a subsequent time horizon of said series of time horizons which is shorter than the previously selected time horizon and generating a warning signal of higher severity level; and e) repeating steps d) above for the remaining time horizons, of said series of time horizons.

2. Method according to claim 1, further comprising determining the time to collision when collision is unavoidable.

3. Method according to claim 1, wherein the velocity changes are changes in direction and/or absolute speed of the driven vehicle.

4. Method according to claim 1, wherein the range of feasible velocity changes that can be reached within a performance time interval are determined according to the performance capability of the driven vehicle.

5. Method for determining an optimal collision mitigating maneuver to be executed by a driver, comprising:

a) providing a navigational system carried by a driven vehicle for sensing navigational conditions of said driven vehicle and of detected vehicles, for processing data associated with said sensed navigational conditions, and for transmitting information of interest to the driver associated with said processed data;

b) generating, based on said processed data, a velocity obstacle corresponding to each of said detected vehicles, each of said generated velocity obstacles being representative of a set of possible velocity vectors associated with motion of said driven vehicle that would result in a collision with a corresponding detected vehicle;

c) based on said velocity obstacle:

c.1) determining possible driver initiated collision avoidance maneuvers to be executed along an unobstructed path corresponding to clearance in the vicinity of one or more of said velocity obstacles;

c.2) determining that a collision between said driven vehicle and one of said detected vehicles is unavoidable once velocity obstacles completely obstruct all lanes in the vicinity of said detected vehicle, comparing, for different regions of each of said velocity obstacles, a predicted magnitude of impact for a collision between said driven vehicle and one of said detected vehicles, and determining an optimal collision mitigating maneuver whereby a selected velocity vector associated with motion of said driven vehicle is to be directed to a region of a velocity obstacle that would result in a collision between said driven vehicle and one of said detected vehicles having a lowest predicted magnitude of impact; and d) transmitting to the driver said determined optimal collision mitigating maneuver.

6. Method according to claim 5, further comprising, after step d), initiating a pre-crash mode whereby vehicular safety accessories are activated.

7. Method according to claim 6, wherein one or more airbags are inflated.

8. Method according to claim 7, wherein one or more airbags are inflated within the interior of the driven vehicle.

9. Method according to claim 7, wherein one or more airbags are inflated at the exterior of the driven vehicle.

10. Method according to claim 6, wherein a bumper is extended.

11. Method according to claim 5, wherein the velocity obstacle is an LVO.

12. Method according to claim 5, wherein the velocity obstacle is an NLVO.

13. Method according to claim 5, wherein step e) is performed by comparing the relative size of a velocity obstacle, a relatively large velocity obstacle indicating that the corresponding detected vehicle is substantially larger and more massive than the driven vehicle.

14. Method according to claim 5, wherein step e) is performed by comparing the relative depth of penetration of one velocity vector within the corresponding velocity obstacles.

15. Method according to claim 5, wherein step e) is performed by comparing the time to collision of the driven vehicle with each of the detected vehicles, a longer time to collision being indicative of a lower magnitude of impact.

16. Method according to claim 5, wherein an optimal collision mitigating maneuver is determined by— a) generating a velocity obstacle, with respect to the position of the driven vehicle, for each detected vehicle at an initial time of detection;

b) generating a velocity frame delimiting the range of velocity vectors attainable by the driven vehicle in a performance time interval subsequent to the initial time;

c) generating a set of velocity obstacles for each detected vehicle at each sampling time interval subsequent to the initial time, until the end of said performance time interval;

d) superimposing said generated velocity frame on each of said sets, whereby to generate a composite representation;

e) determining which of said generated composite representations includes a region of a velocity obstacle having a lowest predicted magnitude of impact; and f) determining an optimal collision mitigating maneuver by generating a velocity vector directed from the end of said velocity vector of the driven vehicle to said region having a lowest predicted magnitude of impact.

17. System for transmitting a warning signal to a driver of a driven vehicle regarding an impending collision with a detected vehicle in the vicinity of said driven vehicle, comprising:

a) sensors for determining the navigational conditions of driven and detected vehicles;

b) an on-board computer, programmed to perform the following operations:

i. processing data associated with said sensed navigational conditions;

ii. generating, based on said processed data, a velocity obstacle for each of said detected vehicles, each of said generated velocity obstacles being representative of a set of possible velocity vectors associated with motion of said driven vehicle that would result in a collision with a corresponding detected vehicle;

iii. determining that a collision between said driven vehicle and one of said detected vehicles is unavoidable once velocity obstacles completely obstruct all lanes in the vicinity of said detected vehicle; and iv. transmitting a warning signal to the driver in an escalating degree of severity concerning the imminence of collision between said driven vehicle and one of said detected vehicles;

v. determining an optimal collision mitigating maneuver;

vi. transmitting said optimal collision mitigating maneuver; and c) a receiver and/or display for receiving said warning signal and said optimal collision mitigating maneuver.

18. System according to claim 17, further comprising at least one safety accessory for mitigating the impact of collision between the driven vehicle and a detected vehicle and means for activating said at least one safety accessory following transmission of said warning signal.

19. System according to claim 18, wherein at least one safety accessory is an airbag or an extendible bumper.

20. System according to claim 17, further comprising control components for temporarily controlling the operation of the driven vehicle during a slave mode, upon consent of the driver.

21. System according to claim 20, further comprising means for overriding the slave mode.

22. System according to claim 17, further comprising an indicator for alerting the driver when the driven vehicle is set in a slave mode.

23. System according to claim 17, further comprising a screen for displaying a clearance curve generated at an instantaneous sampling time interval and delimiting the boundary of safe states of the driven vehicle from states which result in an unavoidable collision, an instantaneous state of the driven vehicle with respect to the clearance curve being displayable by means of said screen.

* * * * *

UNITED STATES PATENT AND TRADEMARK OFFICE
CERTIFICATE OF CORRECTION

| | | |
|---|---|---|
| PATENT NO. | : 7,797,107 B2 | Page 1 of 1 |
| APPLICATION NO. | : 10/571977 | |
| DATED | : September 14, 2010 | |
| INVENTOR(S) | : Zvi Shiller | |

It is certified that error appears in the above-identified patent and that said Letters Patent is hereby corrected as shown below:

Title Page 1, Item (22) PCT Filed:
Delete "Sep. 5, 2004"
Insert --Sep. 15, 2004--

Col. 5, Line 31
Delete "reachel"
Insert --reached--

Col. 8, Line 60
Insert --(-- before linear

Col. 9, Line 6
Delete "come"
Insert --cone--

Col. 9, Line 33
Delete "drives"
Insert --driven--

Col. 10, Line 4
Delete "(t0ΔT)"
Insert --(t0+ΔT)--

Col. 11, Line 64
Delete "NLVO(T)"
Insert --NLVO(t)--

Signed and Sealed this
Twentieth Day of December, 2011

David J. Kappos
*Director of the United States Patent and Trademark Office*